United States Patent [19]

Brown

[11] 4,133,550
[45] Jan. 9, 1979

[54] BICYCLE AND POWER TRANSMISSION SYSTEM

[76] Inventor: Lawrence G. Brown, 3285 Old Highway 395 North, Carson City, Nev. 89701

[21] Appl. No.: 874,786

[22] Filed: Feb. 3, 1978

Related U.S. Application Data

[63] Continuation of Ser. No. 668,043, Mar. 18, 1976, abandoned.

[51] Int. Cl.² .......................................... B60M 23/00
[52] U.S. Cl. .................................. 280/210; 280/238; 280/241; 280/259; 280/261
[58] Field of Search ............... 280/200, 210, 236, 238, 280/241, 251, 253, 255, 256, 259, 261

[56] References Cited

U.S. PATENT DOCUMENTS

| | | | |
|---|---|---|---|
| 258,559 | 5/1882 | Crane | 280/236 |
| 433,172 | 7/1890 | Jett | 280/251 |
| 527,396 | 10/1894 | Whitaker | 280/251 |
| 546,954 | 9/1895 | Decker | 280/261 |
| 596,289 | 12/1897 | Smith | 74/219 |
| 599,689 | 3/1898 | Crandall | 280/251 X |
| 622,780 | 4/1899 | Olson | 280/259 X |
| 636,184 | 10/1899 | Roxendorff | 280/236 |
| 650,344 | 5/1900 | Tuttle | 280/251 X |
| 719,595 | 2/1903 | Huss | 280/251 X |
| 885,982 | 4/1908 | Delacroix | 74/243 |
| 1,179,115 | 4/1916 | La Vake | 280/251 X |
| 2,253,367 | 8/1941 | Di Prima | 146/55 |
| 2,284,595 | 5/1942 | Sissel | 74/117 |
| 2,693,119 | 11/1954 | Payberg | 74/243 X |
| 2,705,612 | 4/1955 | Walker | 255/16 |
| 2,827,797 | 3/1958 | Bell | 74/243 X |
| 3,004,440 | 10/1961 | Pernik | 74/117 |
| 3,047,310 | 7/1962 | De Baun | 280/261 |
| 3,375,022 | 3/1968 | Hattan | 280/261 X |
| 3,375,023 | 3/1968 | Cox | 280/251 |
| 3,759,543 | 9/1973 | Clark | 280/236 |
| 3,834,733 | 9/1974 | Harris | 280/251 |
| 3,888,512 | 6/1975 | Peterson | 280/255 |
| 3,889,974 | 6/1975 | Kallander | 280/251 |

FOREIGN PATENT DOCUMENTS

| | | | |
|---|---|---|---|
| 899237 | 5/1945 | France | 192/48 |
| 14860 of | 1896 | United Kingdom | 280/259 |
| 24525 of | 1896 | United Kingdom | 280/259 |
| 13076 of | 1897 | United Kingdom | 280/259 |
| 24530 of | 1897 | United Kingdom | 280/259 |
| 28160 of | 1897 | United Kingdom | 280/261 |
| 13148 of | 1901 | United Kingdom | 280/259 |

Primary Examiner—Joseph F. Peters, Jr.
Assistant Examiner—Terrance L. Siemens
Attorney, Agent, or Firm—Bruce G. Klaas

[57] ABSTRACT

A drive system for providing propulsion forces having predetermined characteristics for a bicycle or the like having a rear wheel manually operable by application of rider generated input forces through pedals mounted on crank arms operatively connected to a crank shaft with cam means operable by the crank shaft and the crank arms, the cam means being designed to variously modify the available input and/or effective output force characteristics in accordance with predetermined desired characteristics and being operatively connected to and driving an oscillator means with bike speed change means associated therewith to provide a substantially infinitely variable selectable range of bike speeds, and rear wheel driving means operatively connected to and driven by the oscillator means and operatively connected to and driving the rear wheel of the bike with bike speed ratio changing means associated therewith to provide for selective multiplication of the ratio of application of available bike speeds in the substantially infinitely variable range of speeds provided by the oscillator means to the rear wheel of the bike.

140 Claims, 30 Drawing Figures

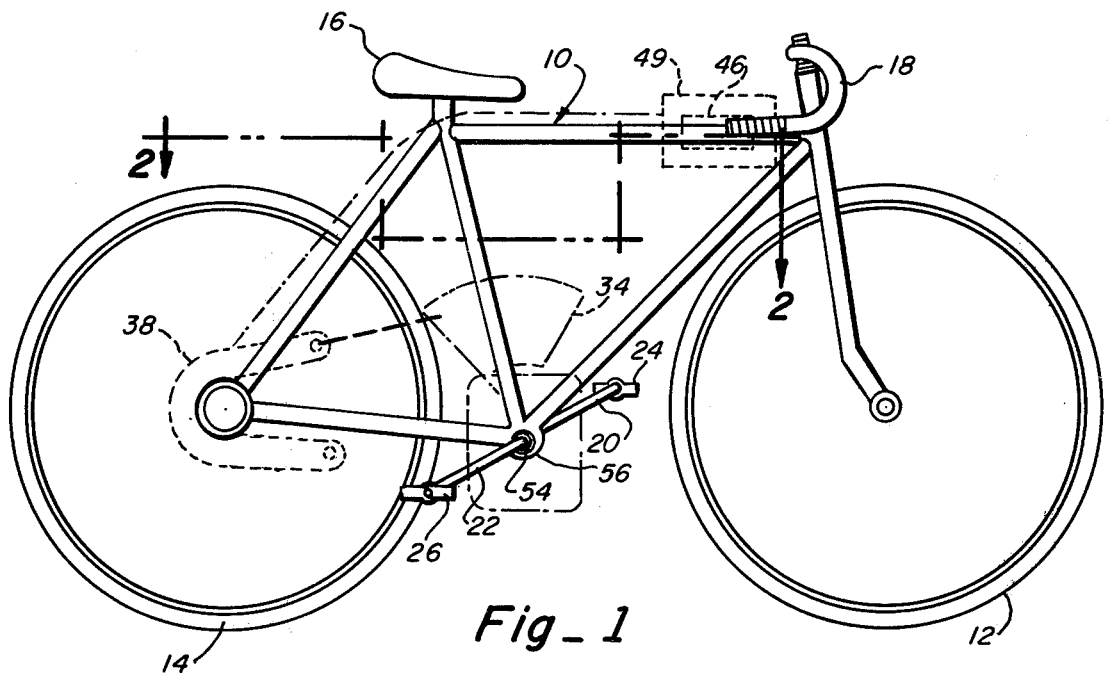
Fig_1
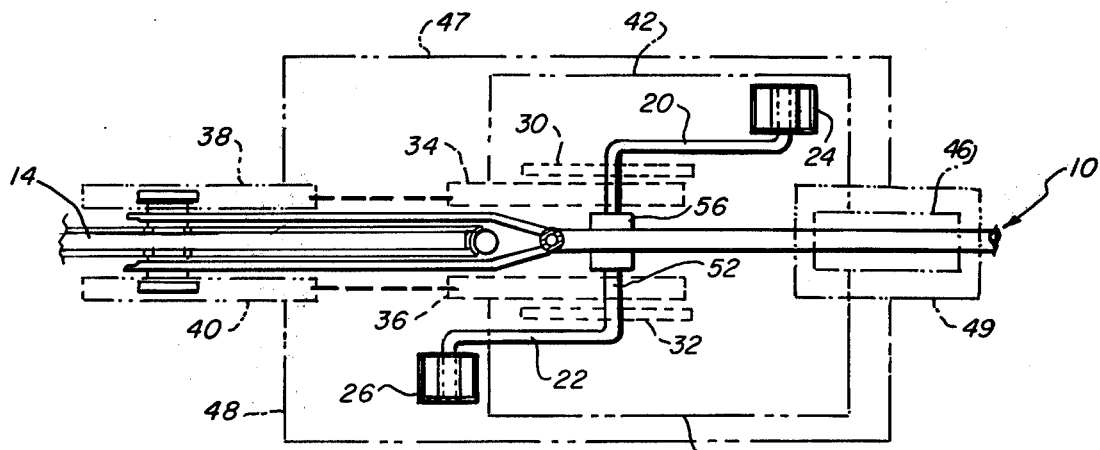
Fig_2
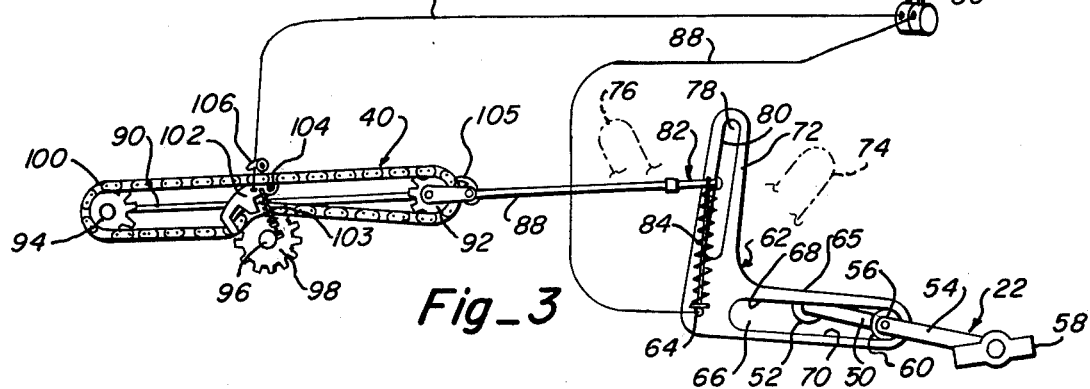
Fig_3

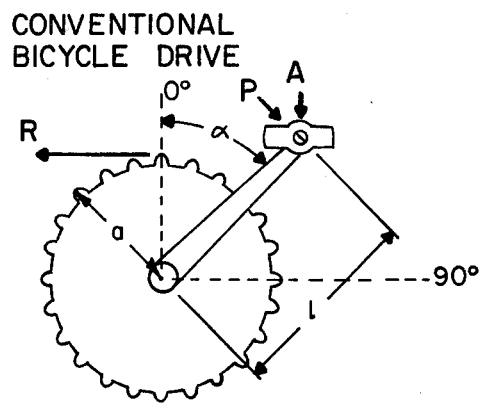
Fig_4
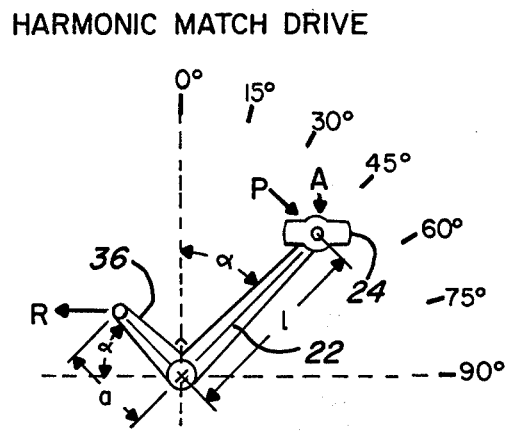
Fig_5
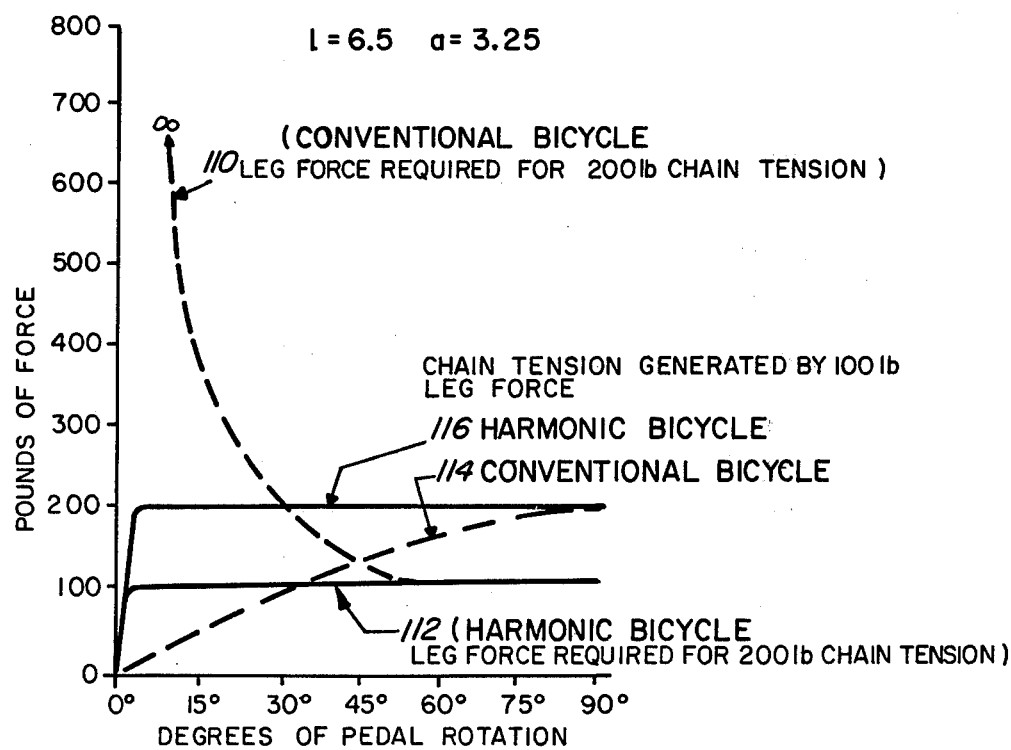
Fig_6

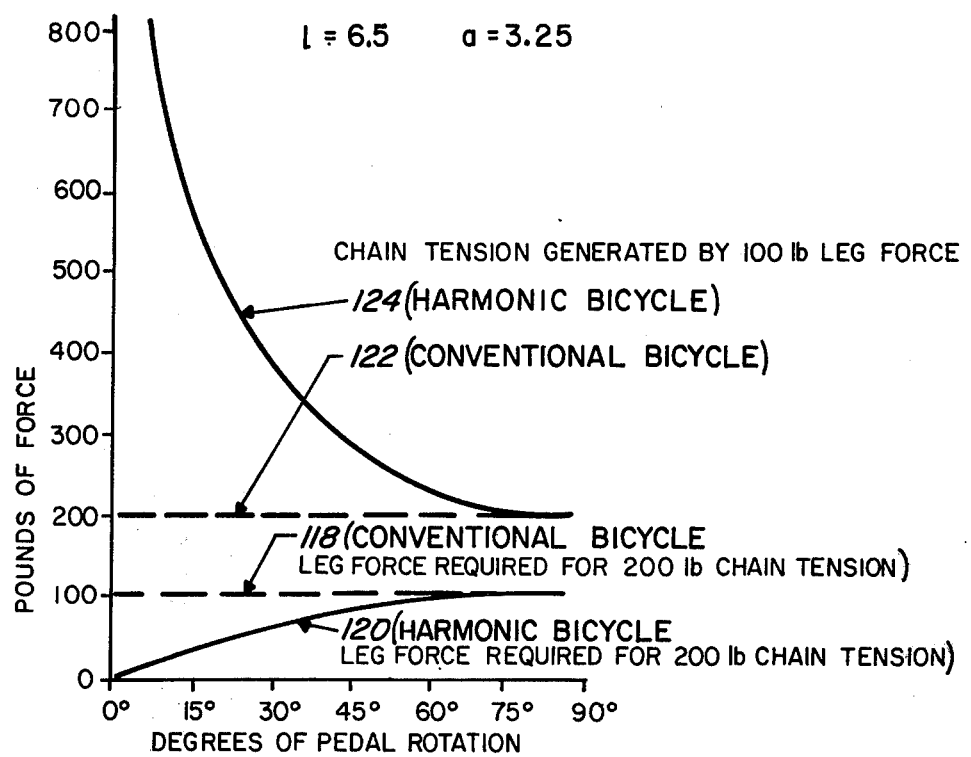
Fig_7
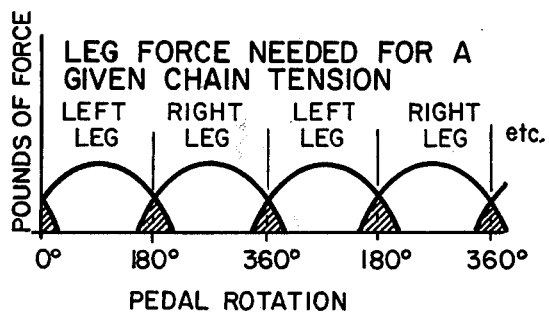
Fig_9
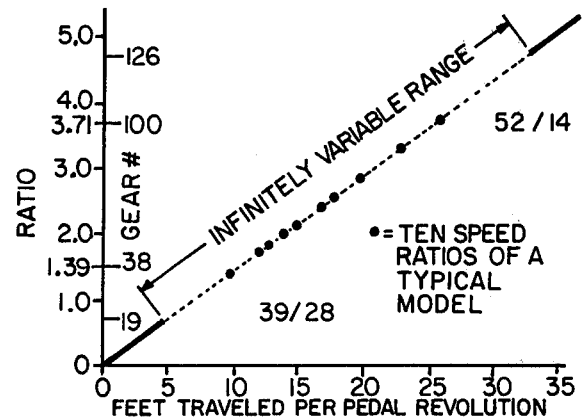
Fig_8

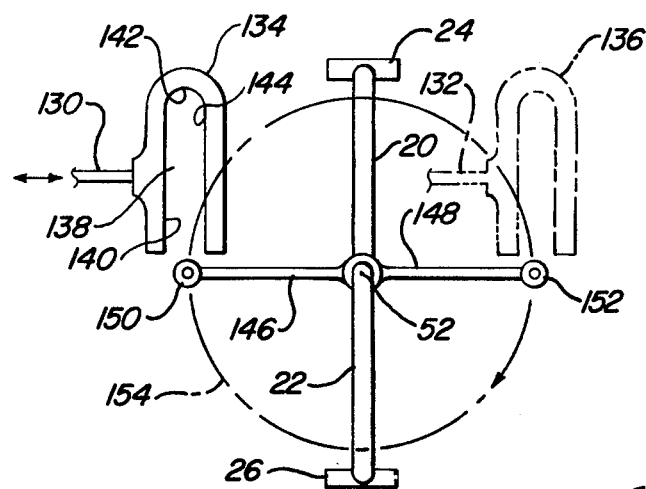
Fig _ 10
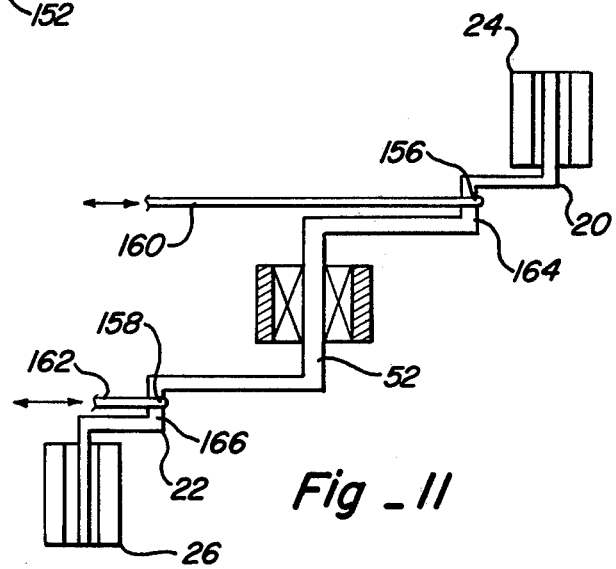
Fig _ 11
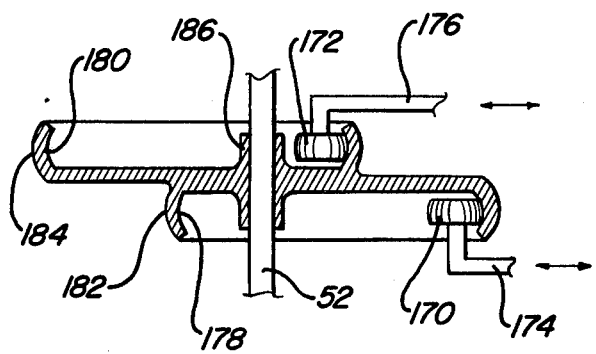
Fig _ 12
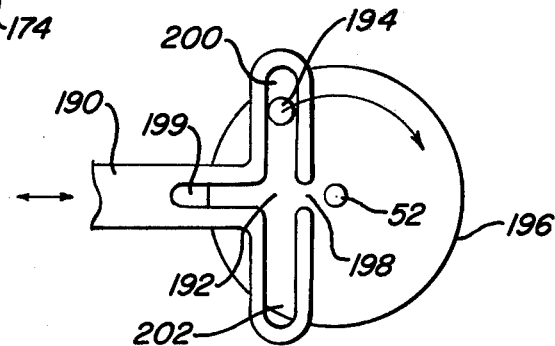
Fig _ 13

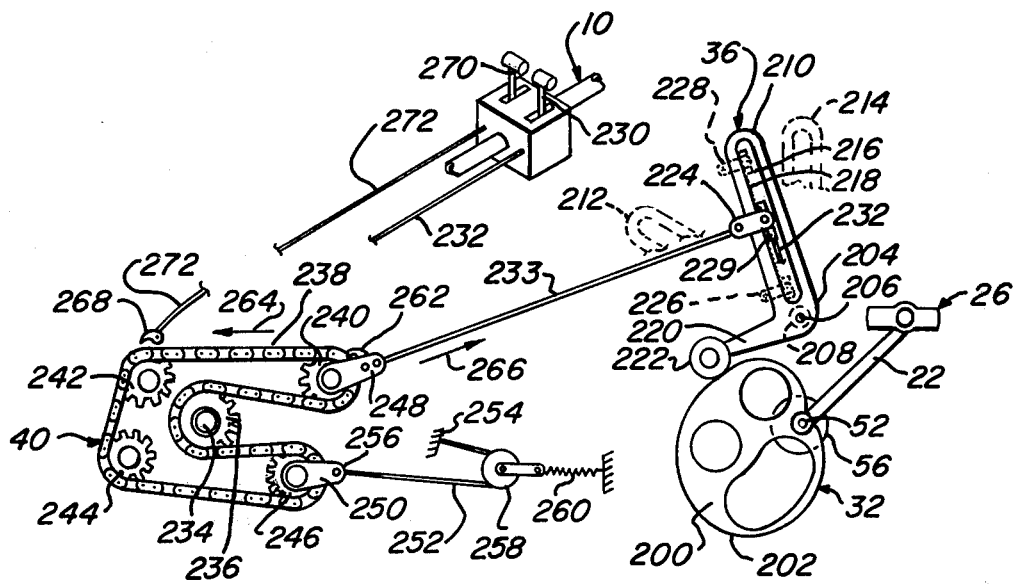
Fig_14
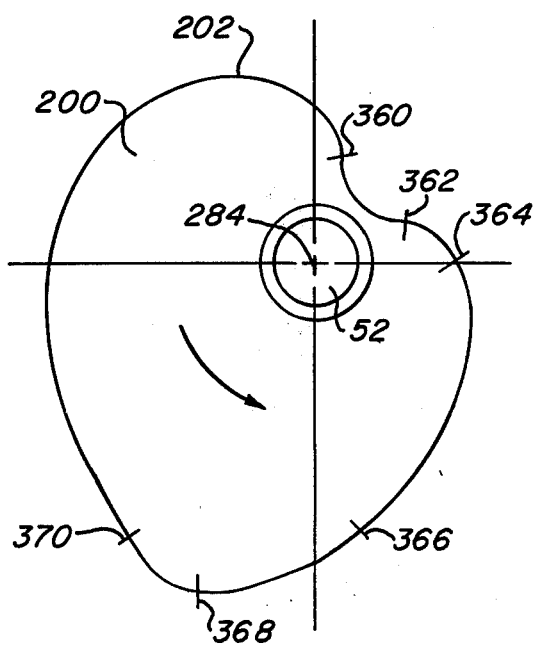
Fig_17
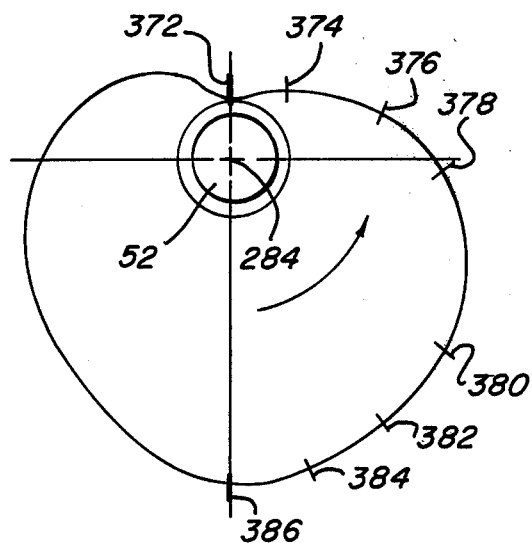
Fig_18

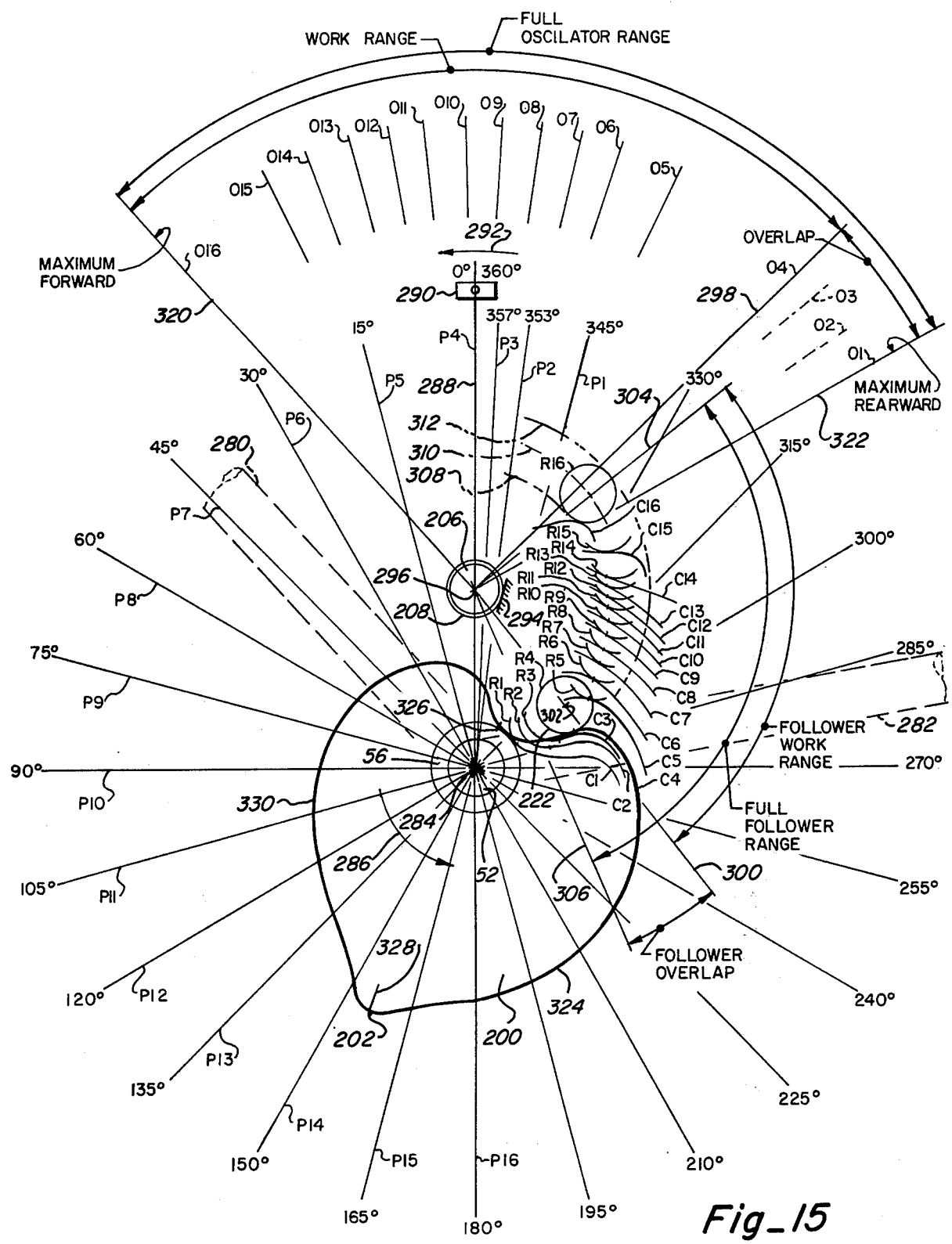
Fig_15

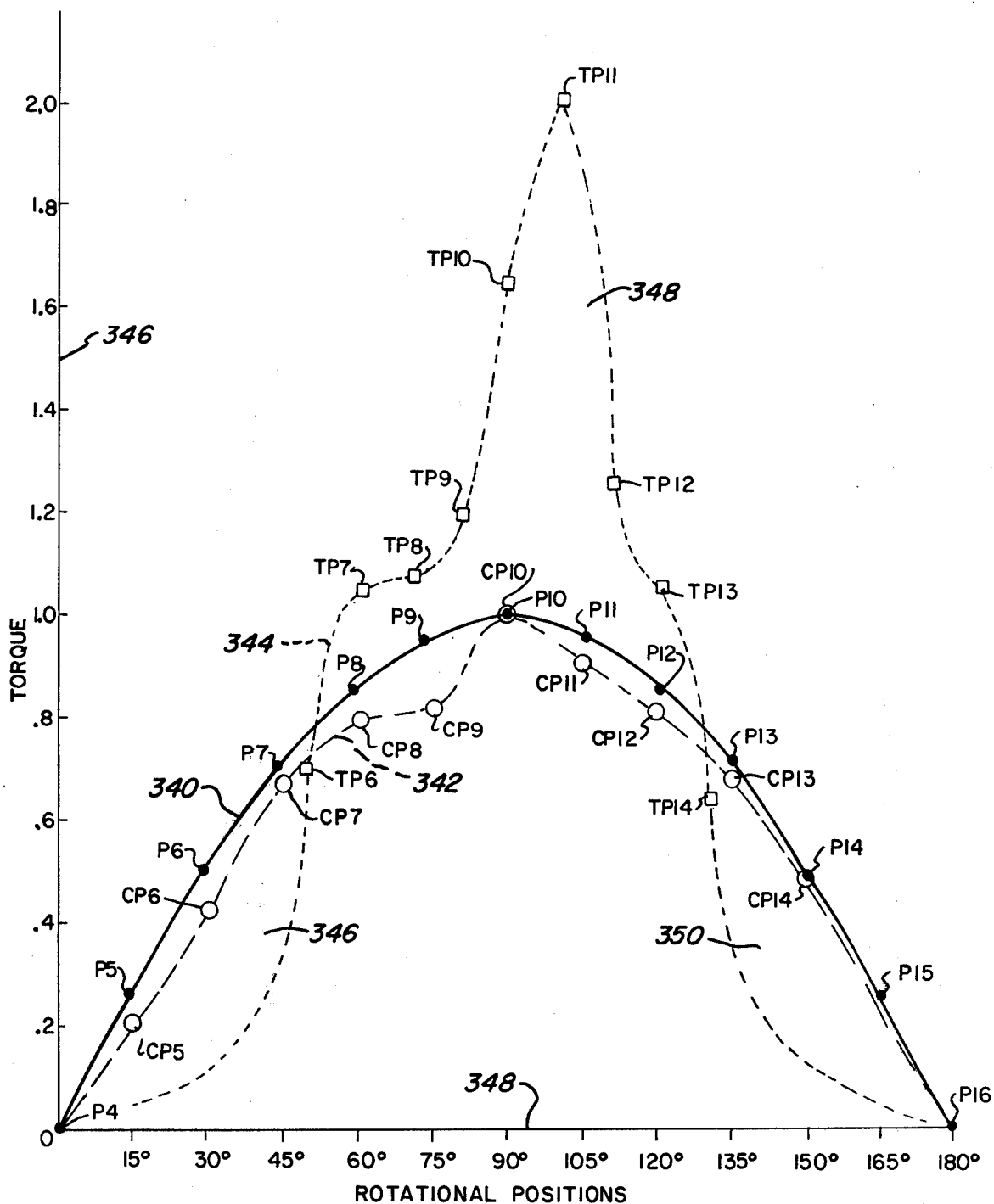
Fig_16

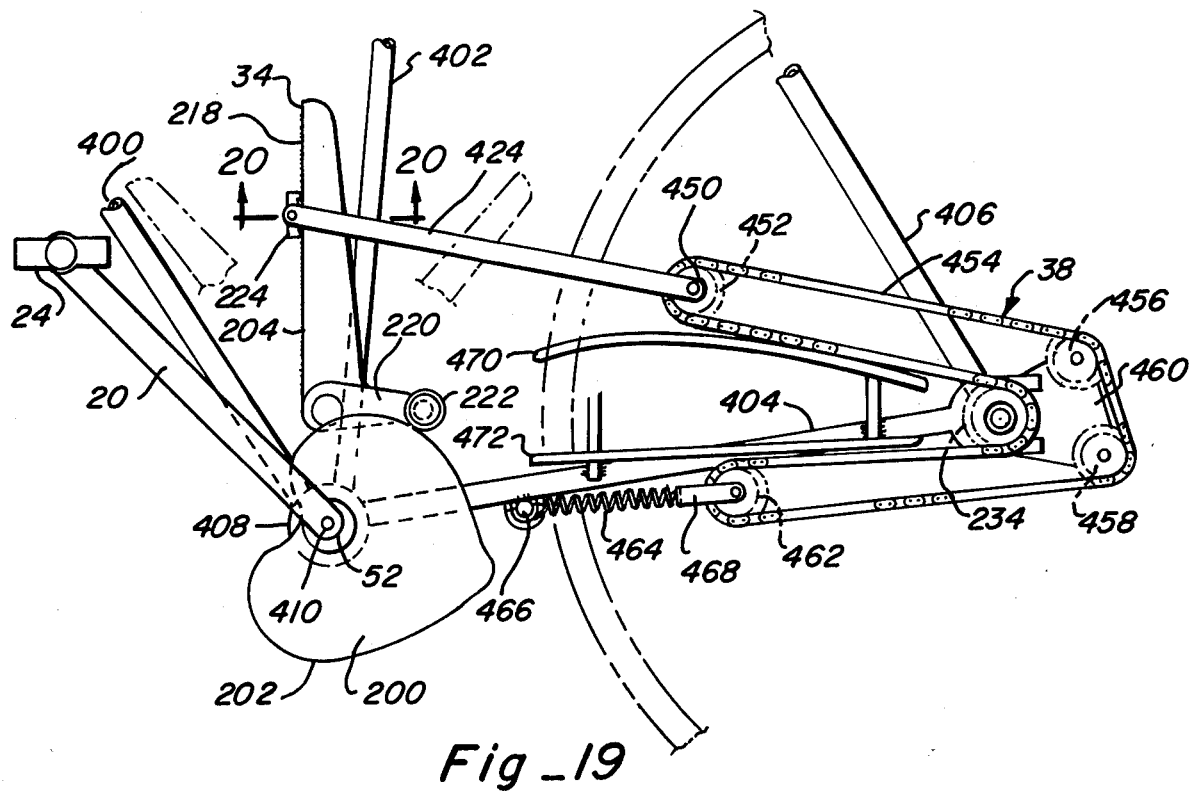
Fig_19
Fig_20
Fig_21

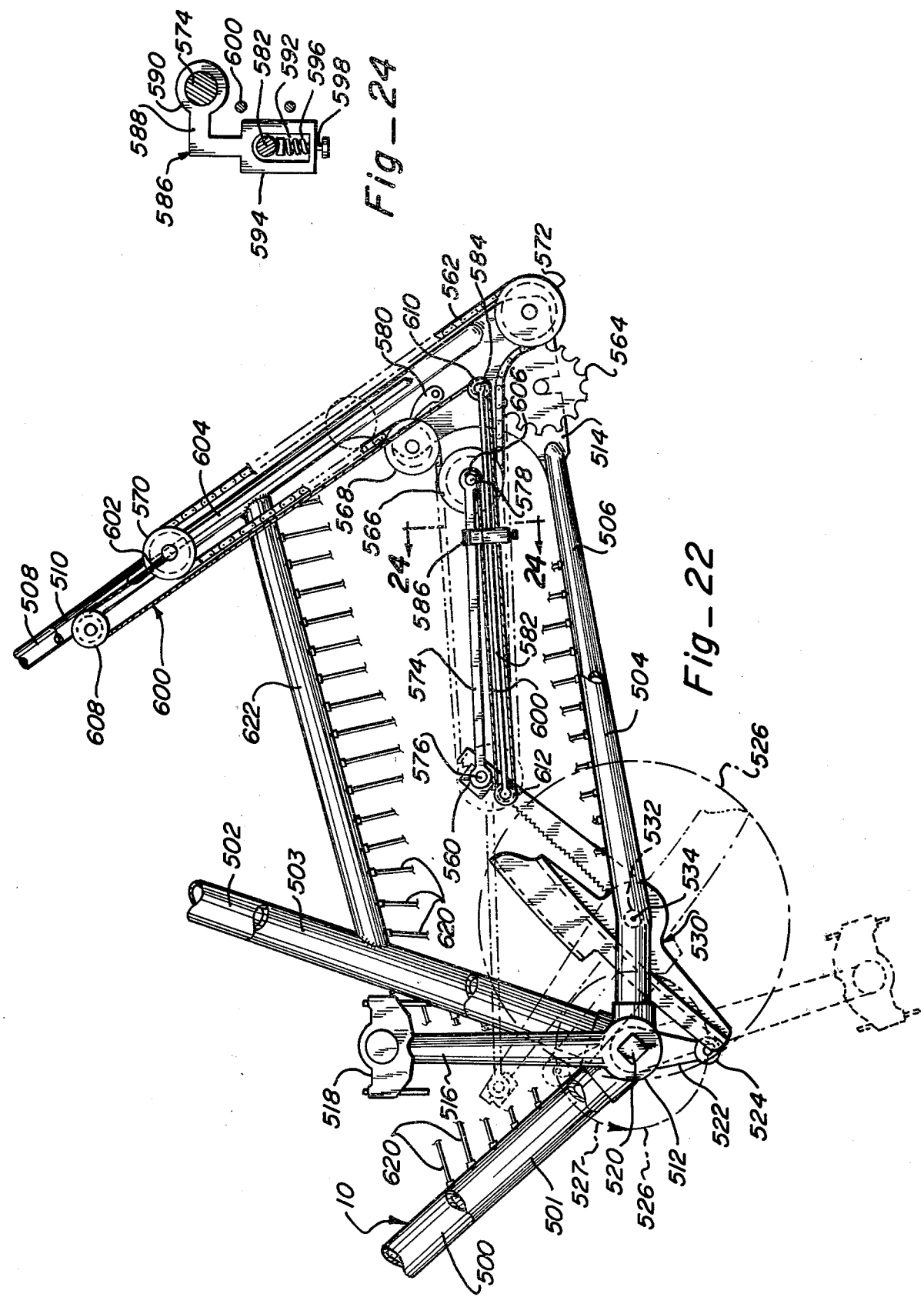

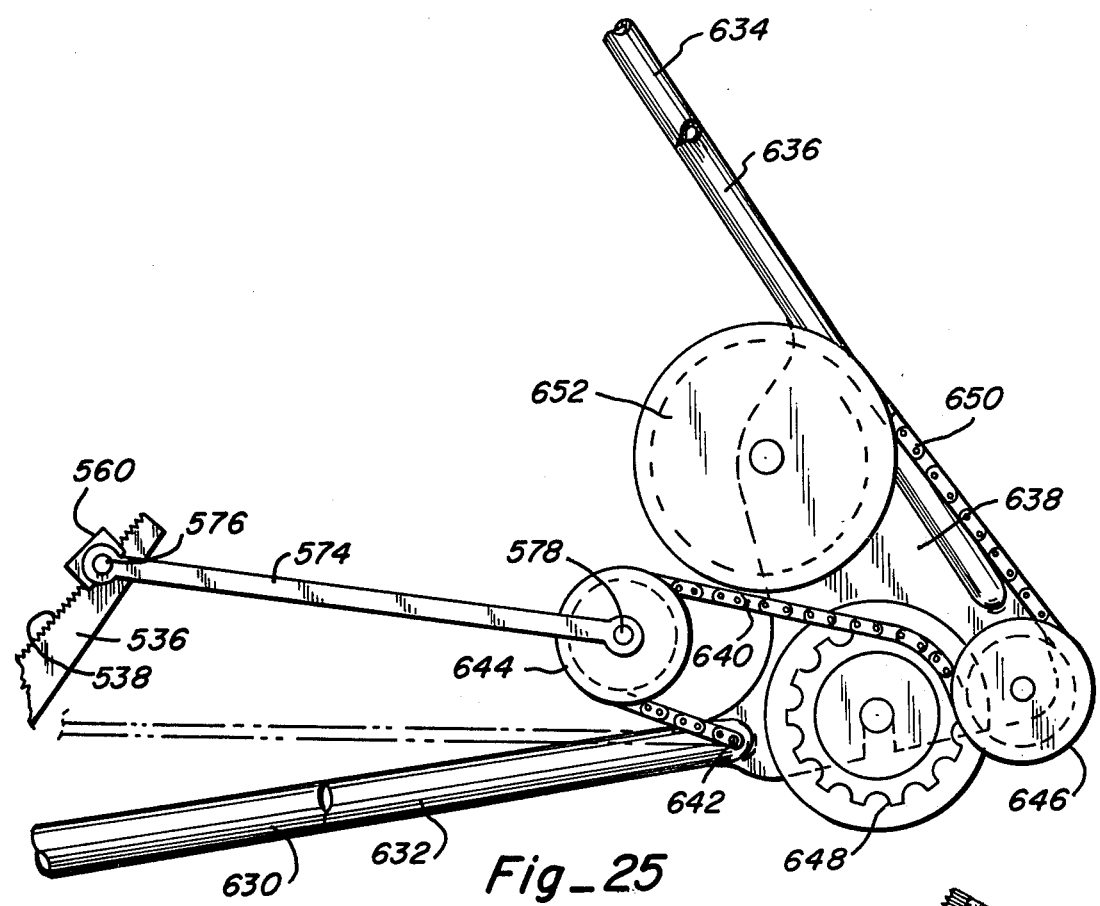
Fig_25
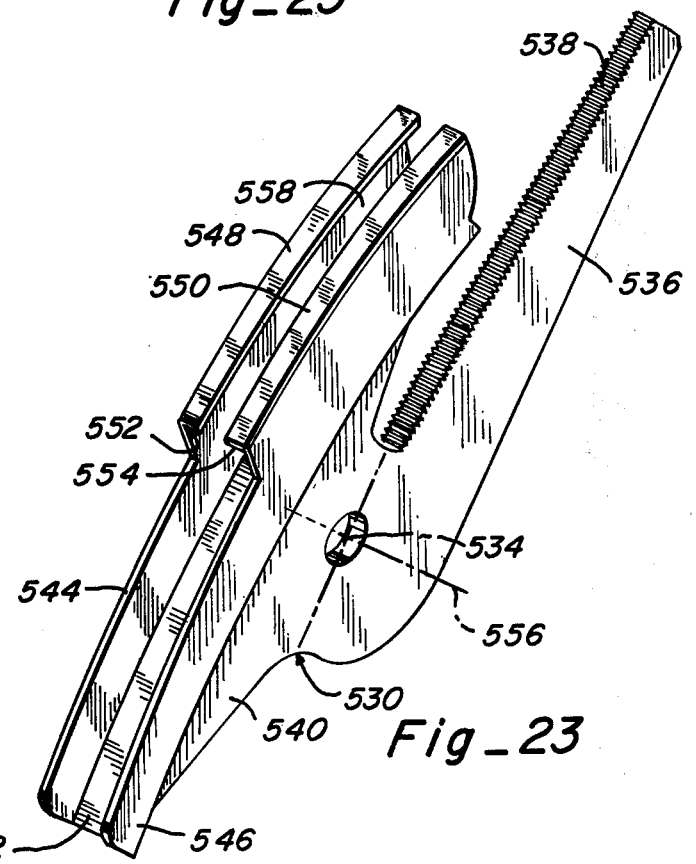
Fig_23

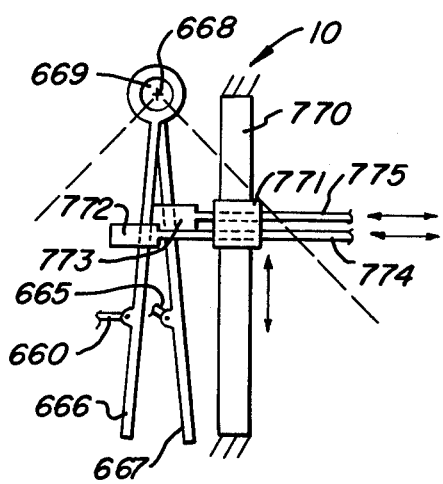
Fig_26
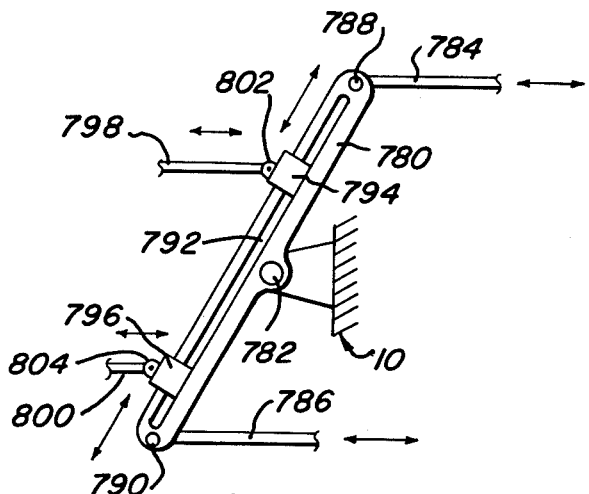
Fig_27
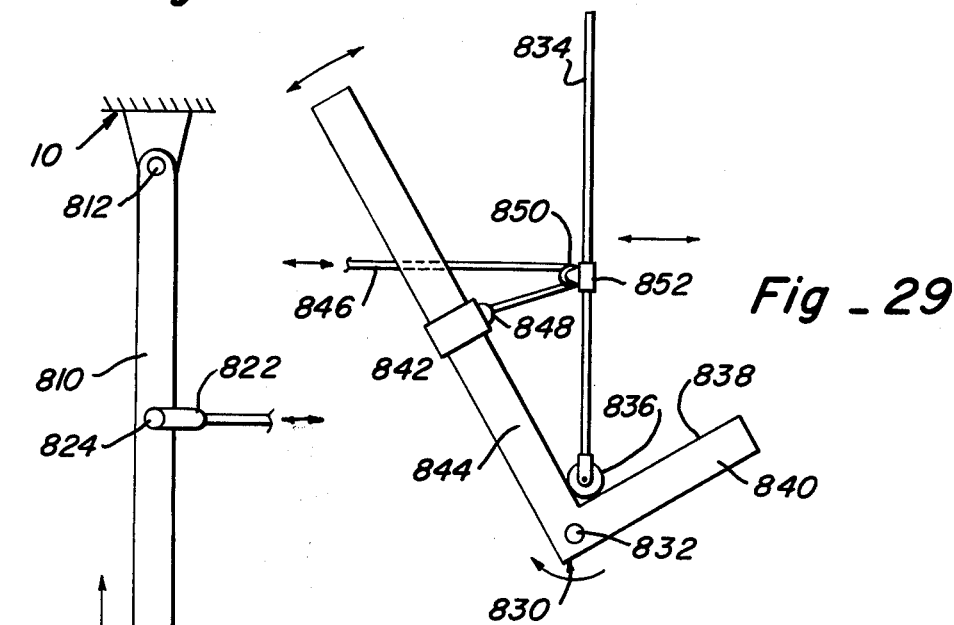
Fig_29
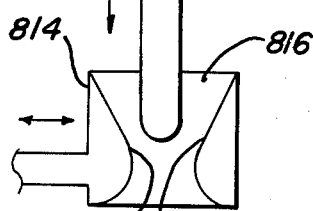
Fig_28
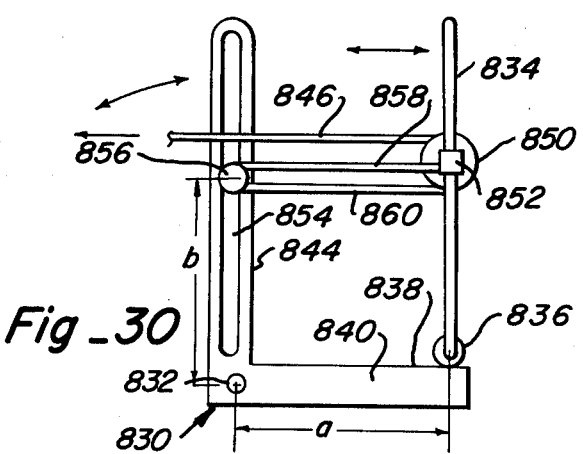
Fig_30

BICYCLE AND POWER TRANSMISSION SYSTEM

This a a continuation, of application Ser. No. 668,043, filed 3/18/76, now abandoned.

BACKGROUND AND SUMMARY OF THE INVENTION

The inventive concepts relate generally to drive systems for variously transferring input force to output force and, more particularly, to drive systems for manually propelled vehicles such as a bicycle or tricycle or the like, wherein the vehicles are propelled by the rider by rider generated force applied through the legs and feet of the rider.

This application is related to my prior pending U.S. patent applications, Ser. No. 426,917, filed Dec. 20, 1973, for INFINITELY VARIABLE BICYCLE TRANSMISSION, ETC., and Ser. No. 438,728, filed Feb. 1, 1974, for INFINITELY VARIABLE TRANSMISSIONS, ETC., the disclosures of which are specifically incorporated herein by reference and the benefit of the filing dates of which are hereby claimed for common subject matter contained herein.

While cycling has been a universal and common mode of transportation for many decades, the drive systems employed at this time as discussed in U.S. Pat. No. 3,889,974, still basically comprise an annular driving sprocket wheel operated by pedal supporting crank arms, an annular driven rear axle sprocket wheel (one speed) or multiple driven varying size rear axle sprocket wheels, and a closed loop chain operably associated with the sprocket wheels. However, the prior art shows that literally thousands of attempts have been made to provide a variety of other types of drive systems for bicycles and the like. At least as early as the Smith U.S. Pat. No. 596,289 of 1897, it has been recognized that the ability of a bike rider to apply imput force through rotary crank arms is limited by the rotary position thereof. Thus, the use of various elliptical or oval driving sprocket wheels has been suggested to variously apply the available input force to an annular driven rear axle sprocket wheel as disclosed in U.S. Pat. Nos. 596,289 of 1897, 885,982 of 1908, 2,693,119 of 1954, 2,827,797 of 1958, 3,259,398 of 1966, and 3,375,022 of 1968.

In addition to the presently commercially available basic single chain drive system, the concept of employing two separate drive systems which are each operable to rotate the one wheel of a bicycle during separate 180° rotation of the crank arms has been known since at least as early as the Crane U.S. Pat. No. 258,559 of 1882. In such systems, each of the crankarms are connected to one of two drive sprocket means by cable or chain type driving means which are effective to transmit force to the wheel by movement from a radial innermost position to a radial outermost position relative to the wheel only during downward movement of an associated lever arm from an upper position to a lower position and are returned from the outermost position to the innermost position by use of one-way clutch means or the like during upward movement of the associated lever arm from the lower position to the upper position. Variations of such drive systems are disclosed in U.S. Pat. Nos. 258,559, 527,396, 598,246, 636,184, 849,342, 3,004,440, 3,375,023, 3,759,543, 3,834,733, 3,888,512 and 3,889,974. Such drive systems have utilized oscillatory type lever arms, reciprocatory type lever arms, and rotary type lever arms. In order to provide a range of variable speeds, various apparatus has been suggested including changing the pedal position relative to the lever arm (U.S. Pat. No. 258,559); changing the location of connection of the drive system on the lever arm (U.S. Pat. Nos. 527,396, 849,342, 3,375,023, 3,759,543 and 3,834,733), including multiplication of a selected speed (527,396); changing the location of an idler pulley or wheel member engaged with a chain intermediate the lever arm and the drive sprocket means (U.S. Pat. No. 636,184); changing the location of the pivotal axis of an intermediate pivotal link driven by the lever arms (U.S. Pat. No. 3,004,440); changing the fulcrum point of the lever arm (U.S. Pat. No. 3,888,512); and changing the radial location of application of force to a driven shaft intermediate the lever arm and the drive sprocket means (U.S. Pat. No. 3,889,974).

Thus the basic form of the drive systems of present day commercially available bicycles has been known for a long period of time. Essentially, all present day commercially available bicycle drive systems of which I am aware involve a force input means in the form of a driving sprocket wheel attached to a crank shaft driven by crank arms having pedals thereon with the force input sprocket wheel connected by a chain member to force output means in the form of a driven sprocket wheel mounted on and drivably connected to a rear wheel axle. Various drive system devices and apparatus have been proposed for providing varying mechanical advantage between the driving sprocket wheel and the driven sprocket wheel for the purpose of increasing or decreasing the speed of rotation of the rear wheel. Current conventional multiple speed (e.g., 3, 5 and 10 speed) bicycles utilize a drive system known as the derailleur system, which comprises a stack of varying diameter and varying tooth number output sprocket wheels. Such systems have many disadvantages, including cost, ease of maintenance and repair, reliability, limitations on available speed selection and shifting from one speed to another, and lack of adaptability to particular requirements of particular bike riding conditions and individual preferences and abilities of different bike riders.

Among the various objectives and advantages of the present invention are capability of selective correlation between available variable force input forces and desired force output characteristics; a drive system with much wider speed range capability and substantially infinite variable selection of speeds within a given speed range; capability of matching resistance to pedaling to the capability of separate groups of riders or individual riders; reduction of rider fatigue; substantially increasing effective output force for the same effective available input force; providing substantially wider effective gear range; a simple fast reaction shifting system with capability of shifting in less than one half pedal revolution at any time without significant loss of driving power; higher efficiency and reduced wear by use of straight line application of driving forces eliminating chain misalignment causing chain binding and sprocket wear associated with conventional systems; lower resistance drag during coasting; capability of fast easy wheel change and drive system part replacement; elimination of maintenance problems including periodic major adjustment requiring special procedures; elimination of need for a dished rear wheel; lower weight; fewer parts and less assembly time during manufacture and mounting on a bicycle.

In general, the inventive concepts are illustratively embodied herein in a bicycle drive system comprising rotatable crank shaft means; crank arm means operably connected to the crank shaft means to cause rotation thereof by application of input force; pedal means attached to the crank arm means for application of input force by a bike rider; cam means operably connected to and driven by the crank shaft means and the crank arm means for variously modifying the input force characteristics and transferring the available effective input force in accordance with predetermined desired characteristics; oscillator means operatively connected to and driven by the cam means for transferring the input force from the cam means as variously modified thereby; substantially infinitely variable speed change means associated with the oscillator means for selective variation of the speed of the bicycle throughout a relatively large range of speeds; rear wheel driving means operatively connected to and driven by the oscillator means and operatively connected to and driving the rear wheel of the bike for applying available force from the oscillator means to the rear wheel of the bicycle; and speed ratio changing means operatively associated with the rear wheel driving means for selective multiplication of the ratio of available bicycle speeds in the substantially infinitely variable range of speeds provided by the oscillator means for application by the rear wheel driving means to the rear wheel of the bicycle. It is to be understood that the various inventive concepts may be utilized by themselves or in sub-combinations or in other combinations to achieve various advantageous results for various other purposes. In addition, it is to be understood that some of the various inventive concepts are illustratively embodied herein in particular structure and in particular combinations providing particularly advantageous results.

BRIEF DESCRIPTION OF THE DRAWING

FIG. 1 is a schematic side elevational view of a bicycle incorporating the inventive concepts;

FIG. 2 is a schematic plan view of a portion of the bicycle of FIG. 1;

FIG. 3 is a schematic side elevational view of one embodiment of a bicycle drive system employing some of the inventive concepts;

FIG. 4 is a schematic side elevational view of a portion of a conventional bicycle drive system;

FIG. 5 is a schematic side elevational view of a portion of a bicycle drive system illustrating some of the inventive concepts;

FIGS. 6–9 are graphs showing advantages of a bicycle drive system employing some of the inventive concepts as compared with a conventional multiple speed bicycle drive system;

FIGS. 10–13 are schematic side elevational views of portions of drive systems illustrating alternative embodiments of some of the inventive concepts;

FIG. 14 is a schematic side elevational view of a bicycle drive system employing some of the inventive concepts;

FIG. 15 is an enlarged schematic side elevational view of a portion of a bicycle drive system illustrating the relationship of pedal means, crank arm means, crankshaft means, cam means, and oscillator means employing some of the inventive concepts;

FIG. 16 is a graph showing advantages of a bicycle drive system employing the inventive concepts of the apparatus of FIGS. 14 and 15 as compared with a conventional multiple speed bicycle;

FIGS. 17 and 18 are side elevational views of alternative forms of design of cam means as illustrated in FIGS. 14 and 15;

FIG. 19 is a schematic side elevational view of an alternative form of bicycle drive system embodying some of the inventive concepts;

FIG. 20 is an enlarged cross-sectional view taken along the line 20—20 in FIG. 19; and FIG. 21 is an enlarged schematic perspective view of a portion of the apparatus of FIG. 19.

FIG. 22 is a schematic side elevational view, partly in section and with parts removed, of an alternative form of bicycle drive system embodying some of the inventive concepts;

FIG. 23 is an enlarged perspective view of a combination cam oscillator means of FIG. 22;

FIG. 24 is an enlarged cross-sectional view taken along the line 24—24 in FIG. 22;

FIG. 25 is a partial side elevational view, partly in section and with parts removed, or another alternative form of rear wheel drive means; and FIGS. 26–30 are schematic side elevational views of alternative forms of oscillating type infinitely variable speed change means.

DETAILED DESCRIPTION

In General

Referring now to FIGS. 1 and 2, in general the inventive concepts are illustrated in connection with a conventional bicycle comprising: frame means 10; front and rear wheel means 12, 14; a rider seat means 16; handle bar means 18 operatively connected to the front wheel means 12 for steering the bicycle; and crank arm means 20, 22 having pedal means 24, 26 for transferring force applied through the feed of the rider to the rear wheel means 14.

The inventive concepts are incorporated in a transmission system for transferring force from the crank arm means to the rear wheel means comprising: cam means 30, 32 operatively connected to and operable by the crank arm means 20, 22; oscillating arm means 34, 36 connected to and operable by the cam means 30, 32; and speed ratio multiplying rear wheel drive means 38, 40 connected to and operable by the oscillatory arm means 34, 36 and connected to the rear wheel means 14 to cause continuous rotation thereof by a wide range of applied forces in excess of variable non-uniform rider generated forces as applied to the crank arm means 20, 22 through the pedal means 24, 26. In addition, the inventive concepts reside in force transfer adjustment means 42, 44 associated with the oscillatory arm means 34, 36 and operable by the rider through remote control means 46, and in force transfer adjustment means 47, 48 associated with the speed ratio multiplying rear wheel drive means 38, 40 and operable by the rider through remote control means 49 located in juxtaposition to the remote control means 46.

Embodiment of FIG. 3

Referring now to FIG. 3, in one embodiment of certain aspects of the inventive concepts, each crank arm means 20, 22 comprises a first crank arm portion 50 connected to a conventional cross shaft portion 52 rotatably mounted in bearing means in a hub portion of the frame means in a conventional manner. A second laterally outwardly offset crank arm portion 54 is connected to crank arm portion 50 by a transverse portion 56. A pedal 58 is conventionally mounted on the outer end of crank arm portion 54.

Each of the cam means 30, 32 comprise roller member 60 rotatably mounted on the transverse crank arm portion 56 and carried in a circular path by the crank arm means. A generally L shaped plate member 62 is pivotally mounted on the frame means 10 by suitable means providing a pivotal axis located at 64. A cam arm portion 65 extends generally forwardly from pivot 64 and has an elongated cam slot 66 providing opposed flat straight cam surfaces 68, 70. The cam roller 60 is received in cooperable operative slidably rotatable engagement on surfaces 68, 70 in slot 66. The arrangement is such that the circular path movement of roller 60 imparts harmonic oscillatory movement to plate member 62.

Each of the oscillator means 34, 36 comprises an oscillator arm portion 72 of plate member 62 extending generally upwardly from pivot 64 and having harmonic oscillatory movement between a maximum forwardly displaced position generally indicated at 74 and a maximum rearwardly displaced position generally indicated at 76. An elongated slot 78 is located in arm portion 72 to provide a forwardly facing force transfer surface 80. A selectively releasable connecting and force transfer means 82 is mounted in slot 78 for gripping engagement with surface 80 at various infinitely adjustable positions therealong. The surface 80 may be serrated and the releasable connecting means 80 provided with cooperable serrations to effect the gripping engagement therebetween.

The position of the connecting means 82 relative to arm portion 72 may be selectively substantially infinitely adjusted along slot surface 80 between maximum and minimum radially outwardly displaced positions relative to pivotal axis 64 by suitable adjustment means which may be in the form of a compression spring member 84 mounted on the oscillator arm portion 72 to bias the connecting means toward the maximum outwardly displaced position. A manually operable control lever 86 mounted on the frame means is suitably connected to the connecting means 82 by a control cable means 88 extending upwardly along the spring member 84. In this manner, the connecting means may be pulled radially inwardly along slot-surface 80 against the bias of spring member 84 and released for movement radially outwardly along slot surface 80.

Each connecting means 82 is attached to one of the rear wheel drive means 38, 40, in the form of a force multiplying block and tackle type system, by connecting rod means 88, 90 attached to rotatable sprocket wheels 92, 94 mounted for reciprocable forward and rearward movement relative to the frame means 10 and the rear axle 96 and rear wheel drive sprocket wheel 98 of the bicycle. The block and tackle system 40 further comprises a closed loop driving chain member 100 mounted on sprocket wheels 92, 94 and 98. Chain tensioning and lifter means in the form of pivotally mounted bracket member 102 pivoted on the frame means at 104 may be provided to maintain desired tension in the chain and to release the chain from engagement with axle sprocket 98 to enable counter clockwise rotation of the rear wheel for backward rolling movement of the bicycle and free chain contact coasting. A spring member 103 is provided to pull the member 102 toward the position of driving engagement between the chain member 100 and the drive sprocket 98. The force multiplying block and tackle means further comprises a first continuously operable low speed one-way ratchet means 105 and a second selectively operable high speed ratchet means 106 pivotally mounted on the frame means adjacent the chain member 100. The second ratchet means 106 is selectively movable between a released low speed position and an engaged high speed position relative to the chain member. In order to selectively simultaneously engage and disengage the ratchet means 106 of both speed multiplier means 38, 40, as well as the lifter means 102, a manually operable control lever 108, mounted on frame means 10 in juxtaposition to control lever 86, is connected thereto by cable means 110.

In operation of the system of FIG. 3, the bike rider applies force to opposite extending crank arms 20, 22 through pedals 58 which causes rotation of the crank arms about the rotational axis of crank shaft 52. The oppositely located rollers 60 are carried in a circular path by the crank arms and are effective in slots 66 to cause oscillatory movement of oscillator arm portions 72 about pivotal axis 64. The arrangement is such that the oscillator arm portions 72 of each oscillator means 34, 36 move in opposite directions with one oscillator arm portion 72 of one oscillator means 34 being moved forwardly during rotation of the corresponding crank arm means 20 from a vertically upwardly extending (0°) position to a vertically downwardly extending (180°) position while at the same time the other oscillator arm portion 72 of the other oscillator means 36 is being decellerated, then moved rearwardly, then reversed and accellerated forwardly, during rotation of the corresponding crank arm means 22 from a vertically downwardly extending (180°) position to a vertically upwardly extending (0°) position. The forward and rearward oscillating movement of each oscillator arm portion of each oscillator means 34, 36 causes corresponding forward and rearward generally linear reciprocating movement of the corresponding connecting means 82, connecting rod means 88, 90, and sprocket wheel means 92, 94 of each block and tackle means. The amount of generally linear movement of the connecting means 82 depends on the length of the arc of its travel with the oscillator arm portion 72 with the length of the arc depending on the radial position of the connecting means 82 on the oscillator arm portion and the length of the arc being infinitely variable between a maximum length at the outer end of slot surface 80 and a minimum length at the inner end of slot surface 80.

When the connecting rod means 88, 90 and sprocket wheel means 92, 94 are pulled forwardly, the chain member 100 is also carried forwardly therewith. The forward movement of the lower chain portion causes clockwise rotation of the drive sprocket 98 and rear wheel axle 96 due to the engagement therebetween whereby the rear wheel rotates clockwise to cause forward movement of the bicycle. When only the low speed ratchet means 105 is engaged with the chain to prevent clockwise movement of the chain, the chain moves forwardly in unison with the connecting rod means 88, 90 and the sprocket wheel means 92, 94 without movement relative to the sprocket wheel means 92, 94. Thus, the forward movement of the oscillator arm means is transmitted to the rear axle sprocket wheel member 98 on essentially a 1:1 ratio. While the one-way ratchet means 105 prevents clockwise movement of the chain relative to the sprocket wheel means 92, 94 during forward movement of the corresponding oscillator arm means, the ratchet means 105 acts as a one way clutch means enabling counter clockwise movement of the chain relative to the sprocket wheel means 92, 94 during rearward movement of the corresponding oscillator arm means so as to enable the continuous clockwise rotation of sprocket wheel 98 and rear axle 96. When the high speed ratchet means 106 is engaged with the upper portion of chain 100, forward movement of the upper portion of the chain is precluded. Thus, as connector rod means 88, 90 and sprocket wheel means 92, 94 are pulled forwardly by the oscillator arm means, the chain must move in a counter clockwise direction relative to sprocket wheel means 92, 94. Since there are two sprocket wheel means 92, 94 dividing the chain 100 into two upper and lower portions, there is a 2:1 block and tackle effect causing the lower portion of the chain to move relative to sprocket wheel 98 twice the distance as in the low speed range resulting in increasing the amount of rotation of the rear wheel twofold the amount of rotation in the low speed range. Again ratchet means 105 and ratchet means 106 act as a one-way clutch enabling the rearward movement of the oscillator arm means and the continuous clockwise rotation of the rear wheel, with the engagement at chain 100 by ratchet means 106 producing a block and tackle, two to one speed increase.

An important feature of such a drive system is the provision of input force overlap means for causing continuous application of input force to the rear wheel through the two separate drive systems associated with the crank arm means 20, 22. The overlap means is provided by the arrangement of the rollers 60, slots 66, axis of rotation of the crank arm means 20, 22 and the oscillator arm means pivoted axis 64, which are arranged to locate the oscillator arms 72 of the oscillator arm means 34, 36 in the maximum rearward positions before the associated crank arm means 20 reaches the upward vertical (0°) position so that each oscillator means begins its forward movement before completion of the forward movement of the other oscillator means as illustrated in FIG. 9. In this manner, there is continuous application of input force to the rear wheel without input force lag at the 0° and 180° positions of the crank arm means.

Another important feature of the present invention is the provision of input-resistance force correlation means for correlating drive system resistance to varying capabilities of bike riders to apply input force on the crank arm means 20, 22. The input-resistance force correlation means is provided by the arrangement of the rollers 60, the slots 66, the rotational axis of the crank arm means 20, 22, and the pivotal axis 64 of the oscillator arm means 30, 32, which are arranged in the embodiment of FIG. 3 to provide a harmonic correlation of input force with resistance force.

Referring now to FIGS. 4–7, the results of such a harmonic correlation of input force with resistance force in the present system are compared with a conventional ten speed bicycle having a conventional derailleur drive system. FIG. 4 illustrates the input force mechanism of a conventional bicycle drive system comprising a pedal, crank arm, and chain sprocket wheel. FIG. 5 illustrates the input force mechanism of the present invention, comprising a pedal 24, crank arm 22, and oscillating arm means 36. The reference character A represents the likely vertical direction of input force application by an inexperienced or amateur rider. The reference character P represents the most desirable direction of input force application at 90° to the crank arm which is currently popularly believed to be more or less achievable by an experienced professional rider. The relationships between the input forces A and P and the theoretically available output force R, which would represent the pulling force in a drive chain operated by each system, are shown by the formulae of FIGS. 4 and 5. Theoretical calculations, which have been substantiated by actual test results, are shown in FIGS. 6 and 7.

Curve 110 of FIG. 6 shows that the input force A required to maintain a 200 pound output force R between 0° and 90° pedal-crank arm rotation in a conventional drive system gradually decreases from about 400 pounds at 15° pedal position to about 100 pounds between about 60° and 90° pedal position. By comparison, curve 112 shows that the input force A required to maintain a 200 pound output force R between 0° and 90° pedal-crank arm rotation in a harmonic drive system of the present invention is a substantially uniform relatively low force of about 100 pounds. Thus, between about 0° and 60° pedal-crank arm position, the drive system of the present invention requires substantially less pedal input force A than the conventional drive system to maintain a 200 pound chain output force R.

Curve 114 of FIG. 6 shows that the chain output force R generated by a constant 100 pound input force A between 0° and 90° pedal-crank arm position in a conventional bicycle gradually increases from 0 pounds to 200 pounds. Curve 116 shows that the output force R generated by a constant 100 pound input force A between 0° and 90° pedal-crank arm position in a harmonic system of the present invention is substantially uniform at about 200 pounds. Thus, the drive system of the present invention produces substantially more chain output force R between about 0° and 75° pedal-crank arm position than the conventional system for a constant input force A while also producing a uniform output force rather than a gradually increasing output force.

Curve 118 of FIG. 7 shows that the input force P required to maintain a substantially uniform 200 pound chain output force R between 0° and 90° pedal-crank arm position in a conventional drive system is a substantially uniform force of about 100 pounds. Curve 120 shows that the input force P required to maintain a substantially uniform 200 pound output force R between 0° and 90° pedal-crank arm position in a harmonic drive system of the present invention gradually increases from about 0 pounds to about 100 pounds between about 75° and 90° pedal position. Thus, the same chain output force R can be obtained by the present invention with less input force P than by the conventional system.

Curve 122 shows that the output chain force R generated by a substantially constant input force P of 100 pounds between 0° and 90° pedal-crank arm position in a conventional drive system is a substantially constant 200 pounds. Curve 124 shows that the chain output force R generated by a substantially constant input force P of 100 pounds between 0° and 90° pedal-crank arm position gradually decreases from about 700 pounds at 15° pedal-crank arm position to about 200 pounds between 75° and 90° pedal-crank arm position. Thus, between about 0° pedal-crank arm position and about 75° pedal-crank arm position, the drive system of the present invention provides greater chain output force than the conventional system for the same amount of pedal input force.

Another advantage of the drive system of the present invention is the provision of means for providing an effectively infinitely variable speed range by use of the oscillator means 34, 36 which may be designed to provide a mechanical advantage range from 0 to any maximum within the practical limits of the radial length of the oscillator arm means, in combination with the rear wheel drive means 38, 40, which also may be designed to provide a mechanical advantage range which may vary by multiple integers from a 1:1 ratio (i.e. 0) to increased ratios of 2:1, 3:1, etc., or to decreased ratios of 1:2, 1:3, etc. Referring to FIG. 8, a comparison of the drive system of the present invention, as illustrated in FIG. 3, with a conventional ten speed drive system shows that the present invention provides not only a much wider range of selectable speeds (i.e., mechanical advantages) than the conventional system, but also a substantially infinitely variable number of selectable speeds as compared with the limited fixed number of selectable speeds in the conventional system. For example, the lowest speed position of a current popular conventional ten speed system is a low gear number of 38 having a pedal sprocket-rear wheel sprocket tooth ratio of 39:28 providing a rear wheel-crank arm wheel revolution ratio (hereinafter "revolution ratio") of 1.39:1, whereas the drive system of the illustrative embodiment of FIG. 3 has an effective low gear number of 19 providing a revolution ratio of 0.7:1. Similarly, the highest speed position of such a conventional ten speed system is a high gear number of 100 having a sprocket tooth ratio of 52:14 providing a revolution ratio of 3.71:1, whereas the drive system of the illustrative embodiment of FIG. 3 has a much higher speed position having an effective gear number of 126 providing a revolution ratio of 4.67:1. FIG. 8 also shows that the location of the ten fixed speed positions of the conventional drive system are substantially limited by the requirement of an integral number of teeth on the drive sprockets for any selectable gear number. Thus, the location of the ten speed positions tend to be relatively closely spaced in the one extreme or to be variably widely space in the other extreme. On the other hand, the drive system of the present invention enables selection of any possible effective gear number as well as unlimited movement from one effective gear number to another effective gear number, within a given speed range, whereas in the conventional drive system the gear numbers must be selected in increasing or decreasing order.

As shown in FIG. 8, ultimate advantageous results of the speed selection improvements of the present invention are that the bicycle will travel both faster and slower than the conventional ten speed bicycle and the bicycle of the present invention can be riden at any selectable speed within the speed range, whereas the conventional bicycle can only be riden at one of the ten speed positions selected in increasing or decreasing order.

Embodiments of FIGS. 10–13

Referring now to FIGS. 10–13, several alternative and modified embodiments of portions of the drive systems of FIG. 3 are illustrated which may be utilized to provide force correlation means, which may be harmonic or sinusoidal, between crank arm means 20, 22 and a rear wheel drive block and tackle system or other rear wheel drive means 38, 40.

Referring to FIG. 10, block and tackle means, or other rear wheel drive means 38, 40, of the type described in my prior applications, Ser. Nos. 426,917 and 438,728, are connected by rod means 130, 132 to inverted U shaped yoke members 134, 136, which are reciprocably movable between a maximum rearward position of yoke member 134 and a maximum forward position of yoke member 136. Each yoke member has a downwardly opening elongated slot 138 providing a forwardly facing elongated surface 140, a curved upper downwardly facing surface 142, and a rearwardly facing elongated force applying abutment surface 144. A pair of oppositely extending force transfer arms 146, 148, spaced 90° from crank arms 20, 22, are fixed to and extend radially outwardly from crank shaft position 52 for rotation therewith. Roller members 150, 152 are rotably mounted on the end portions of arms 146, 148 and carried thereby along a common circular path of movement 154. During downward rotation of crank arm 20 from 0° to 180°, the roller 150 enters slot 138 of the yoke member 134 in the rearwardmost position, then engages surfaces 144 and pulls the yoke member 134 forwardly to the forwardmost position, and then leaves the slot 138 at which time the other roller 152 enters the slot 138 of the other yoke member 136 which has then been returned to the rearwardmost position during the forwardmost movement of the yoke member 134, it being understood that, as disclosed in my prior application, Ser. No. 438,728, the rod members 130, 132 and the block and tackle means 38, 40 are interconnected through the rear wheel drive sprockets and axle to be oppositely reciprocated in unison.

The arrangement is such that the input force applied through the pedals 24, 26 and the crank arms 20, 22 is harmonically correlated with the theoretical resistance R of the output force transfer means 130, 132, 134, 136, so that at vertical pedal-crank arm (0°) position, where input force availability is zero, the theoretical resistance R is zero, while at 90° pedal-crank arm position, where input force ability is maximum, the theoretical resistance R is also maximum.

Referring now to FIG. 11, similar harmonic or sinusoidal force correlation may be obtained by pivotally connecting the front end portions 156, 158 of rod members 160, 162, attached to the rear wheel drive means 38, 40, to intermediate laterally extending portions 164, 166 of the crank arm means 20, 22, the portions 164, 166 being equally radially spaced from the axis of rotation of the crankshaft portion 52.

Referring now to FIG. 12, similar harmonic or sinusiodal force correlation may be obtained by roller members 170, 172 on the forward ends of connecting rod members 174, 176, attached to block and tackle or other drive means 38, 40, engageable with circular cam surfaces 178, 180 on cam plate members 182, 184, the cam surfaces being equally oppositely eccentrically mounted relative to the rotational axis of the crankshaft 52 and fixedly mounted thereon by suitable hub means 186 for rotation therewith as the crank shaft is rotated by the crank arms and pedals.

Referring now to FIG. 13, similar harmonic or sinusoidal or other force correlation may be obtained by a cam plate member 190, attached to each block and tackle or other drive means 38, 40, having an elongated cam slot 192, in which a roller member 194 is confined. Each roller member 194 for each cam plate member 190 may be rotatably mounted on a rotatable support plate member 196 fixedly mounted on the crankshaft 52 for rotation therewith under the influence of input forces applied through the pedals and crank arms. The axis of rotation of each roller member 194 is equally eccentrically located relative to the axis of rotation of the crankshaft 52 with the roller members being oppositely located so as to be spaced 180° circumferentially. In order to enable the cam plate member 190 to move forwardly beyond the crankshaft 52, a central opening 198 opposite a slot portion 199 is provided to receive the crankshaft 52. The size of openings 198, slot portions 199, and the diameters of crankshaft 52 and roller members 194 are such as to permit the crankshaft 52 to enter slots 192, 199 through openings 198 while preventing movement of the roller members 194 through openings 198 or into slot portions 199 to confine the roller members in the slots 192. The arrangement is such that one slot portion 200 is effective, during rotation of one of the crank arms from the upper vertical (0°) position to the lower vertical (0°) position, to forwardly pull the cam plate 190, and one of the drive means 38, 40 attached thereto, to a forwardmost position with harmonic or simusoidal correlation between the input force and the theoretical resistance R on the cam plate. The other slot portion 202 is effective, during rotation of the one crank arm from the lower vertical (180°) position to the upper vertical (0°) position, to rearwardly push the cam plate 190, and one of the drive means 38, 40 attached thereto, to a rearwardmost position. As described in my prior application, Ser. No. 438,728, while the straight elongated shape of slots 192 produce pure harmonic reciprocable motion of cam plate members 190, the slots 192 may be made in other shapes with curved surfaces which would provide other types of force correlation whereby the motion of cam plate members 90 may be stopped, retarded, advanced or increased or decreased in speed relative to any rotational position of the crankshaft 52 and associated crank arms and pedals.

Embodiments of FIGS. 14–20

Referring now to FIG. 14, in presently preferred embodiments of the inventive concepts of FIGS. 14–20, each of the cam means 30, 32 are shown to comprise a cam plate member 200 fixedly but replaceably attached to the crankshaft member 52 connecting the crank arm means 20, 22 through conventional bearing-housing assembly means 56 fixed on the frame means 10. A contoured cam surface 202 extends continuously about the periphery of the cam plate 200 which is mounted in a predetermined location on the crankshaft 52 relative to the crank arm 22. The contour of cam surface 202 may be varied to variously correlate the input force imparted by the rider to the crank arm means to the theoretical resistance R of the drive means 38, 40 or to the actual force and resistance relationships in the drive system. The cam plate member 200 is removably mounted relative to the crank arm means 20 and relative to other drive system components so as to be easily replaceable, whereby cam plate members having variously contoured cam surfaces 202, may be provided in accordance with the characteristics of force application of a particular rider or a particular group of riders, i.e., men or women, adults or children, racer, or recreational riders, etc.

The cam means surface 202 is designed to cause predetermined rotational movement of oscillator means 36 related to the rotational position of the crank arm 22 to correlate input force and actual resistance characteristics of the drive system, with a view toward maximizing the usage of available power input of the bicycle rider while also improving the average power input characteristics of the system.

The illustrative cam contour of FIG. 14 provides harmonic match as hereinbefore described, but may be changed to effect varying results for varying riding characteristics and for varying abilities or capabilities of various riders as hereinbefore described in further detail.

Each of the oscillating arm means 34, 36 are shown to comprise a generally L shaped member 204 pivotally mounted relative to the frame means 10 on shaft means which may be in the form of opposite ends of a common shaft member 206 mounted in a common housing 208 fixed to the frame means. An elongated pull arm portion 210 of oscillator member 204 extends radially outwardly from shaft member 206 and is pivotally movable thereabout between opposite extreme rearward and forward positions of oscillation indicated by dotted lines 212, 214. An elongated radially extending slot 216 is provided in arm portion 210 to define a forwardly facing rear surface 218. Suitable gripping means, such as knurling, serration, ribs, threads or the like, are provided along surface 218. The oscillator also has a cam arm portion 220 extending rearwardly at substantially a right angle to arm portion 210. A cam roller 222 is rotatably mounted on the rearward end of arm portion 220 and is maintained in engagement with the peripheral surface of cam 200 by a suitable means such as a spring or a guide slot or the like, to control the position of the oscillator member 204 relative to pivot 206.

A selectively releasable connecting means 224 is slideably adjustably mounted on arm portion 210 for radial inward and outward movement therealong between a first radially innermost position and a second radially outermost position indicated by dotted lines 226, 228. Thus, at the radially innermost position, 226, the connecting means 224 is carried by arm portion 210 along an arcuate path of minimum circumferential length while, at the radially outermost position 228, the connecting means is carried by arm portion 210 along an arcuate path of maximum circumferential length. The connecting means 224 is preferably adjustably connected to arm portion 210 by frictional engagement between surface 229 of member 224 and surface 218 which extends between the innermost and outermost positions so as to enable infinitely variable positioning of the connecting means therebetween. The associated remote control means 46 of FIG. 1 may be in the form of a manually operable actuator device illustrated in FIG. 14 as a control lever 230 which may be mounted on an upper portion of the frame means 10 between the seat means and the handle bar means. A movable connecting member 232, such as a Bowden cable, is suitably connected at one end of the control lever 230 and at the other end to connecting means 224 whereby forward movement of the control lever between maximum rearward and forward positions causes radial outward displacement of the connecting means 224 relative to the arm portion 210 and rearward movement of the control lever causes radial inward displacement of the connecting means 224 relative to arm portion 210. The arrangement is such that the connecting means 224 on each arm portion 210 of each oscillator means 34, 36 is simultaneously uniformly adjusted by the movement of a single control lever 230 which is similarly connected to each of the connecting means 224.

Each of the rear wheel drive means 38, 40 is operatively connected to gripping means 224 by connecting drive means 233, in the form of a wire, rod, cable, etc., and to the rear bicycle axle 234 and drive sprocket wheel 236. The rear wheel drive means 40 of FIG. 14 is in the form of a block and tackle system comprising a continuous closed loop chain member 238 mounted on drive sprocket wheel 236 and sprocket wheels 240, 242, 244, 246. Sprocket wheels 242, 244 are fixedly rotatably mounted on the bicycle frame means 10. Sprocket wheels 240, 246 are slidably guidably mounted in elongated guide means (not shown) attached to the bicycle frame means 10 for reciprocable movement relative thereto. Sprocket wheel 240 is connected to connection means 233 by a pivotally mounted connecting link member 248 so as to be reciprocably linearly movable in response to the movement of the oscillator member. A drive system return means is connected to sprocket wheel 246 by a pivotally mounted connecting member 250 and comprises a cable member 252 fixedly connected at one end to the bicycle frame means 254 and at the other end 256 to the connecting member. The cable member 252 is looped around a pulley member 258 connected to the bicycle frame by a spring means 260. A one-way ratchet means 262 is associated with sprocket wheel 240 to permit movement of the chain 238 relative to sprocket wheel 240 only in the direction of arrow 264 whereby, during movement of sprocket wheel 240 in the direction of arrow 266, the chain is directly moved with the sprocket wheel 240 thereby causing rotation of axle 234 on a 1:1 speed ratio. During rearward movement of sprocket wheel 240 opposite the direction of arrow 266 under the influence of spring means 260, the ratchet 262 releases to permit movement of the chain relative thereto resulting in non-driving movement of chain relative to drive sprocket 236. In order to change the speed ratio of the system from 1:1 to 2:1, a selectively operable one-way ratchet means 268 is associated with sprocket wheel 242. When the ratchet means 268 is engaged with chain 238 on sprocket wheel 242, forward linear movement of sprocket wheel 240 in the direction of arrow 266 causes the chain to move twice as far and results in double rotation of sprocket wheel 236 and rear axle 234 as when ratchet means 268 is disengaged. The ratchet means 268 is also arranged so as to permit relative movement between the chain and the sprocket wheel when return force is applied in the direction of arrow 264 by spring 260. Remote control means 48 comprises a manually operable actuator device such as a control lever 270, which may be mounted on the upper portion of the frame means 10 in juxtaposition to control lever 230. Each drive system 38, 40 has a movable connecting member 272, such as a Bowden cable, connected at one end to control lever 270 and at the other end to ratchet means 268, whereby location of the control lever 270 in a rearward position corresponding to the rearward position of control lever 230 places the ratchet means 268 in the engaged position and location of the control lever 270 in a forward position corresponding to the forward position of control lever 230 places the ratchet means in the disengaged position.

Thus, the present system enables the selection of a wide range of infinitely variable speeds. In the lowest speed position, control levers 230 and 270 are in corresponding rearwardmost positions whereat oscillator connecting means 224 are at radially innermost positions on the oscillator arm portions 210 and ratchet means 268 are disengaged to provide a 1:1 speed ratio in chain drive systems 38, 40.

A substantially infinitely variable low speed range is provided by selective simultaneous adjustment of the oscillator connecting means 224 between the radially innermost positions and the radially outermost positions on the oscillator arm portions 210 by moving the control lever 230 between the rearwardmost and forwardmost positions. Whenever the bicycle rider desires to "shift" the chain drive systems 38, 40 from the low 1:1 speed ratio to the high 2:1 speed ratio, the control lever 270 may be actuated to engage ratchet means 268 with chain means 238. In the high 2:1 speed ratio range, the oscillator connecting means 224 are also fully adjustable between the radially innermost and outermost positions to provide a substantially infinitely variable high speed range. In order to enable smooth, easy, transition between the low speed range and the high speed range, the control levers 230, 270 may be mounted in juxtaposition with suitable correlation of movement. For example, control lever 230 is preferably arranged so that forward movement increases speed and rearward movement decreases speed in each speed range. Control lever 270 is preferably arranged so that, in a forwardmost position corresponding to the forwardmost position of control lever 230, ratchet means 268 are disengaged and th chain drive means 38, 40 are in the 1:1 speed ratio of the low speed range. Thus, when lever 230 has been placed in the high speed low speed range forward position, both levers 230 and 270 may be grasped and moved rearward to simultaneously "shift" the chain drive means 38, 40 to the 2:1 speed ratio high speed range while also locating the oscillator connecting means 224 in the radially innermost "low" speed position in the high speed range, from which the speed again may be gradually infinitely variably increased as the lever 230 is moved forwardly causing the oscillator connecting means 224 to move radially outwardly.

Referring now to FIG. 15, illustrative and presently preferred cam means 30, 32 are shown to each comprise a cam plate member 200 fixedly mounted on crank shaft 52 rotatably mounted in a bearing hub 56 fixedly mounted on frame means portions 280, 282. Crank shaft 52 and cam member 200 are rotatable about central axis 284 in the direction of arrow 286 by the radially extending crank arm means, schematically illustrated by radial line 288, and pivotally mounted pedal means, schematically illustrated at 290, which are rotated in the direction of arrow 292. The crank arm line 288 represents an upper (0°) vertical position and cam member 200 is fully shown in its position at the upper (0°) vertical position of the crank arm and the pedal member 290. The reference designations P1-P16 refer to radial lines representing various rotational positions of the crank arm and pedal member beginning with the 345° rotational position thereof and ending with the lower vertical 180° rotational position thereof. The reference designations C1-C16 refer to the cam member 200 and portions thereof in various rotational positions of the cam member corresponding to the various rotational positions P1-P16 of the crank arm and pedal member.

The associated one of the oscillator means 34, 36 is schematically shown with oscillator shaft 206 pivotally mounted in hub member 208 fixed to a portion of the frame means at 294 to provide a pivotal axis 296, which in the illustrative embodiment, is located on vertical radial line 288 but may be variously otherwise positioned. The oscillator means pull arm portion 210 is represented by and located along a radial line 298, when the crank arm 288 is in the upper (0°) vertical position P4, and follower arm portion 220 is represented by and located along a radial line 300 when the crank arm 116 is in the upper vertical (0°) position P4. In the illustrative embodiment, the central longitudinal axis of the pull arm portion 298 and the follower arm portion 300 are circumferentially spaced approximately 95°. The cam follower means, roller member 222, having a rotational axis at 302, is rotatably mounted on the radially outer end portion of the follower arm portion 300 in continuous engagement with the peripheral cam surface 202 of the cam member 200. The reference designations R1-R16 refer to the roller member 222 and portions thereof in various positions as displaced between a maximum upward position represented by radial line 304 and a maximum downward position represented by radial line 306 along arcs 308, 310, 312 having centers at 296 and representing, respectively, the path of movement of the radially inner peripheral portion, the axis of rotation, and the radially outer peripheral portion of the roller member 222. The reference designations R1-R16 refer to the various positions of the roller member corresponding to the various rotational positions P1-P16 of the crank arm 288 and pedal member 290, as well as to the various rotational positions C1-C16 of the cam member 200. The reference designations O1-O16 refer to the oscillator pull arm portion 298 in various positions, as circumferentially displaced between a maximum forward position represented by radial line 320 and a maximum rearward position represented by radial line 322, which correspond to the various positions P1-P16 of the crank arm 288 and pedal member 290, the various positions C1-C16 of the cam member 200, and the various positions R1-R16 of the roller member 222.

The peripheral surface 202 of cam member 200 comprises an oscillator means driving surface portion 324 extending between lines 326, 328 for causing forward displacement of oscillator pull arm portion 298 from the rearwardmost position O1 at 322 to the forwardmost position O16 at 320. The peripheral surface 202 of cam member 200 further comprises an oscillator means return surface portion 330 extending between lines 326, 328 for guiding rearward displacement of oscillator pull arm portion 298 from the forwardmost position O16 at 320 to the rearwardmost position O1 at 322. Cam surface portions 324, 330 are connected by a cam follower return transition surface portion at and adjacent to line 328 located radially outermost from central axis 284 and a cam follower driving transition surface at and adjacent to line 326 located radially innermost from central axis 284.

The cam follower driving transition surface at 326 is designed and arranged to terminate the rearward return movement and begin the forward movement of the pull arm portion 298 of the oscillator means prior to the time that crank arm 288 and pedal member 290 reach the vertical 0° P4 position. In this manner, forward motion overlap means are provided for causing both oscillator means 34, 36 to be moved forward at the same time during a portion of each revolution of the crank shaft 52. The illustrative arrangement is such that the upward motion of the roller member 222 begins at position R1 along radial line 307 when cam member 200 is in position C1 with the crank arm 288 and pedal 290 located at position P1 after 345° of rotation of the crank arm 288 from the vertical 0° position P4 and 15° before again reaching the vertical 0° position. At this time, the other crank arm is located 180° opposite the crank arm 288 at the 165° position P15 with the other oscillator pull arm portion being moved forward at the O15 position. As the crank arm 288 rotates upwardly from position P1 at 345° to positions P2 at 353°, P3 at 357°, and P4 at 0°, the roller member 222 is moved upwardly from position R1 to corresponding position R2, R3 and R4 and pull arm portion 298 is moved forwardly from position O1 to corresponding positions O2, O3 and O4. At the same time, the other crank arm rotates downwardly from position P15 at 165° to position P16 at 180° so that, when roller 222 is moving upward at position R4, the other roller is in the uppermost position R16 in engagement with the transition surface at 328. The amount of overlapping forward movement of the oscillator pull arm portions 298 may be varied from cam design to cam design by changing the curvature of transition surface at 326 as necessary or desirable.

The portion 324 of cam surface 202 between the transition surfaces at 326, 328 provides work surface means designed and arranged to position and correlate the pull arm portion 298 relative to the position of crank arm 288 in a manner providing input-output force correlating means for continuously varying the effective radial and circumferential location of application of input force, as applied to the crank arm 288 through pedal 290, to the pull arm portion 298 of the oscillator means through cam means 200 and cam follower means 222 in accordance with various force application and transmittal characteristics, as well as varying resistance and torque characteristics encountered in a bicycle drive system.

In general, one work surface means design consideration is the fact that the effective work range of the crank arm 288 and pedal 290 is from approximately 0° to 180°. In other words, the input force transmitted to the pedal 290 through the foot and leg of the rider can be effectively transmitted to the drive system only in the effective work range during downward movement of the crank arm 288. Furthermore, the maximum effective work position of the crank arm 288 is at the horizontal 90° position P10 where the available input force is fully applied at right angles to the crank arm 288. Another design consideration, which may be taken into account in connection with the present invention is that the available input force at any given position in the effective work range usually varies between persons and usually varies from leg to leg of the same person. In fact, test results have shown a considerable difference in patterns of available input force between persons who are experienced bike riders and persons who are merely recreational bike riders. Thus, the present invention provides the highly desirable result of enabling cam design for varying capabilities of different riders as well as varying leg thrust capabilities of a particular rider.

The illustrative cam design of FIG. 15 is based upon the general premise that maximum effective force transmittal from the crank arm 288 and pedal 290 to the oscillator means and hence to the rear wheel of the bicycle, can be achieved by matching maximum input force capability of the rider with maximum force transmittal capability of the drive system.

As shown in FIG. 15, as the crank arm 288 and pedal 290 are driven by the available input force of the rider from position P4 at 0° to position P10 at 90°, the cam follower roller 222 is moved further upwardly from position R4 to position R10, which in the illustrative embodiment is generally horizontal, by generally gradually decreasing amounts of circumferential displacement and the pull arm portion 298 is moved further forwardly from position O4 to position O10, which in the illustrative embodiment is substantially vertical. As the crank arm 288 and pedal 290 are driven further downwardly by the available input force of the rider from position P10 at 90° to position P16 at 180°, the cam follower roller 222 is moved further upwardly from position R10 to position R16 by generally increasing amounts of circumferential displacement and the pull arm portion 298 is moved further forwardly from position O10 to position O16.

The results achieved are illustrated by the various circumferential distances travelled by the crank arm 288, the roller 222, and the pull arm portion 298. While the crank arm 288 moves downwardly equal circumferential distances between positions P4-P16, the roller member 222 is moved upwardly gradually decreasing circumferential distances from position R4 to position R10 and gradually increasing circumferential distances from position R10 to position R16. At the same time, pull arm portion 298 initially moves forwardly a relatively large circumferential distance from position O4 to position O5 whereafter the driving arm portion moves forwardly from position O5 to position O15 in relatively small uniform circumferential distance increments and at the termination of the forward movement between positions O15 and O16 again moves a relatively large circumferential distance. As a result the available input forces at positions P5-P15 of the crank arm 288 are transmitted through the cam member 200, the roller member 222. the follower arm portion 300, and the pull arm portion 298 in a manner providing a desired maximum effective output force available on the pull arm portion for transmittal to the rear wheel. Thus, force correlation means are provided to enable the bike rider to provide substantially greater effective output force to the wheel than in the conventional bicycle between P5-P15 positions of the crank arm.

The cam design of FIG. 15 has been tested on a test bike having the aforedescribed transmission system cam design and the results produced thereby have been compared with the results produced by a conventional ten speed bicycle having a conventional chain-multiple sprocket transmission system. One test comprised static measurement of the vertical force on the pedal of each bike at various rotational positions of the pedal required to balance the same resistance on the rear wheel when each bike transmission system was adjusted to have the same mechanical advantage, i.e., the conventional bike and the test bike were in the same effective gear. The results of static tests for an effective gear No. 33.75 (tooth ratio of 40/32) are indicated hereinafter in Table I and in the graph of FIG. 16, of the drawing.

TABLE I

| PP° | P6/30° | P7/45° | P8/60° | P9/75° | P10/90° | P11/105° | P12/120° | P13/135° | P14/150° |
|---|---|---|---|---|---|---|---|---|---|
| PWC# | 21.5 | 13.5 | 11.3 | 11.0 | 9.0 | 10.0 | 11.0 | 13.2 | 18.5 |
| PWT# | 12.8 | 8.6 | 8.4 | 7.6 | 5.5 | 4.5 | 7.2 | 8.6 | 14.0 |
| PWC/ |  |  |  |  |  |  |  |  |  |
| PWT% | 68 | 57 | 34.5 | 44.7 | 63.6 | 122.2 | 52.8 | 50.5 | 37.1 |
| WPC° | 30 | 45 | 60 | 75 | 90 | 105 | 120 | 135 | 150 |
| WPT° | 49.2 | 61 | 71.6 | 81.4 | 90.3 | 100.4 | 110.3 | 120.6 | 130.8 |
| WPV° | +19.2 | +16 | +11.6 | +6.4 | +0.3 | −4.6 | −9.7 | −14.4 | −19.2 |
| 9/PWC | .42 | .67 | .80 | .82 | 1.0 | .90 | .82 | .68 | .49 |
| 9/PWT | .70 | 1.05 | 1.07 | 1.18 | 1.64 | 2.00 | 1.25 | 1.05 | .64 |

| | |
|---|---|
| PP | = Pedal position in degrees in the maximum available input force range as measured from the vertical 0° pedal position. |
| PWC | = Pedal weight of conventional ten speed bike in pounds of force applied vertically downwardly on the pedal to balance four pound rear wheel weight applied vertically downwardly at 90° rear wheel position 15 inches rearwardly of rear wheel axis. |
| PWT | = Pedal weight of test bike in pounds of force applied vertically downwardly on the pedal to balance four pound rear wheel weight applied vertically downwardly at 90° rear wheel position 15 inches rearwardly of rear wheel axis. |
| PWC/PWT | = The percentage increase in pounds of force required to balance the same rear wheel weight with a conventional ten speed bike as compared with the test bike. |
| WPC | = Wheel position of conventional ten speed bike relative to pedal position in one to one transmission ratio. |
| WPT | = Wheel position of test bike relative to pedal position in one to one transmission ratio. |
| WPV | = Wheel position variance of rear wheel of test bike relative to rear wheel of conventional ten speed bike. |
| 9/PWC | = Conversion of pedal weight data of conventional ten speed bike on 9 pound base at 90° pedal position. |
| 9/PWT | = Conversion of pedal weight data of test bike on 9 pound base at 90° pedal position. |

Referring to Table I, the test results show that the test bike of the present invention required a substantially lesser input force than the conventional ten speed bike to overcome the resistance of the rear wheel at each measured pedal position. In addition, the cam design of the test bike results in variance of the rear wheel position relative to pedal position so that resistance of the rear wheel is variably transferred to the pedal in accordance with predetermined pedal position design characteristics of the cam.

The cam design is such that at 0° (P4), 90° (P10) and 180° (P16), pedal positions, the wheel position is correspondingly 0°, 90° and 180°. At 15° (P5) and 165° (P15) pedal position, the wheel position is 35.4° and 144.8°, respectively. Thus between 0° (P4) and 15° (P5) pedal position, the relative wheel position is rapidly advanced from the coincident 0° position to a maximum advanced position of approximately 20° and between 165° (P15) and 180° (P16) pedal position, the relative wheel position is again rapidly advanced from a maximum retarded position of approximately 20° Ato the coincident 180° position. The maximum advanced wheel position attained at the 15° pedal position is maintained substantially constant from the 15° pedal position (P5) to the 30° pedal position (P6) and the maximum retarded wheel position attained at the 150° pedal position (P14) is maintained substantially constant from the 150° pedal position (P14) to the 165° pedal position (P15).

As shown in Table I, between pedal position P6 (30°) and pedal position P10 (90°), the advanced position of the rear wheel of the test bike is progressively decreased relative to the position of the pedal and the corresponding position of the rear wheel of the conventional ten speed bike. The amount of rear wheel advancement progressively decreases from approximately 19.2° at pedal position P6 (30°) to substantially coincident relative positions at pedal position P10 (90°). Thus, the effective resistance of the rear wheel to rotation from 0° to 90° has been redistributed relative to the pedal positions. The effective resistance of the rear wheel to rotation from 0° to approximately 49.2° has been concentrated in the portion of the pedal rotation from 0° to 30° in which range the capability of the bike rider to supply input force on the pedal is minimal and inertial effects may be best utilized to overcome the rear wheel resistance. The effective resistance of the rear wheel to rotation from 49.2° to 90° has been distributed over the portion of the pedal rotation from 30° to 90°, in which range the capability of the bike rider to supply input force on the pedal progressively increases, in a manner such as to progressively reduce the effective resistance of the rear wheel to rotation from pedal position P7 (35°) to pedal position P10 (90°) in a range progressively increasing capability of the bike rider to supply input force.

Between pedal position P10 (90°) and pedal position P16 (180°), the position of the rear wheel of the test bike is progressively retarded relative to the position of the pedal and the corresponding position of the rear wheel of the conventional ten speed bike. The amount of rear wheel retardation progressively increases from approximately 0° at pedal position P10 (90°) to approximately 20° at pedal position P14 (150°), and is maintained substantially constant at approximately 20° between pedal position P14 (150°) and pedal position P15 (165°), and is then rapidly decreased from approximately 20° at pedal position P15 (150°) to a coincident position with the pedal at P16 (180°). Thus, the effective resistance of the rear wheel to rotation from 90° to 180° has been redistributed relative to the pedal positions. The effective resistance of the rear wheel to rotation from approximately 130.8° to 180° (i.e., approximately 50° of rotation) has been concentrated in the portion of the pedal rotation from 150° (P14) to 180° (P16) in which range the capability of the bike rider to supply input force on the pedal is gradually decreasing and inertial effects may be best utilized to overcome the rear wheel resistance. The effective resistance of the rear wheel to rotation from approximately 90° to approximately 130.8° (i.e., approximately 40° of rotation), in which range the capability of the bike rider to supply input force on the pedal progressively decreases, has been changed in a manner such as to progressively increase the effective resistance of the rear wheel to rotation from pedal position P10 (90°) to pedal position P14 (150°) in a range of progressively decreasing capability of the bike rider to supply input force.

Referring now to FIG. 16, curve 340 represents the theoretical available output torque at the rear wheel of the conventional ten speed bike, curve 342 represents the calculated available torque at the rear wheel of the conventional ten speed bike based upon the actual test results, and curve 344 represents the calculated available torque at the rear wheel of the test bike based upon the actual test results. The vertical ordinate axis 346 represents available output torque and horizontal abscissa axis 348 represents rotational positions of the rear wheel and crank arm from a vertical 0° upper position to a vertical 180° lower position of the crank arm. The available output torque has been calculated on a relative percentage basis with the maximum available torque of the conventional ten speed bike at the 90° wheel position (and 90° pedal position) represented as a base torque of 100% inch pounds so that the vertical data points of the curves correspond to the calculations 9/PWC and 9/PWT of Table I. Thus, the points CP6, CP7, CP8, CP9, CP10, CP11, CP12, CP13 and CP14 of the conventional bike curve 342 are located on the vertical axis at 0.42, 0.67, 0.80, 0.82, 1.0 base), 0.90, 0.82, 0.68 and 0.49, respectively. The points TP6, TP7, TP8, TP9, TP10, TP11, TP12, TP13 and TP14 of the test bike curve 344 are located on the vertical axis at 0.70, 1.05, 1.07, 1.18, 1.64, 2.00, 1.25, 1.05 and 0.64, respectively. The points P6, P7, P8, P9, P10, P11, P12, P13 and P14 of the theoretical conventional bike curve 340 are located on the vertical axis at 0.50, 0.71, 0.86, 0.96, 1.00, 0.96, 0.86, 0.70 and 0.50, respectively.

With respect to horizontal axis, the points CP6, CP7, CP8, CP9, CP10, CP11, CP12, CP13 and CP14 of the conventional bike curve 342 and points P6, P7, P8, P9, P10, P11, P12, P13 and P14 of the theoretical conventional bike curve 340 are located at 30°, 45°, 60°, 75°, 90°, 105°, 120°, 135° and 150°, respectively, which represent both pedal positions and wheel positions. At the same pedal positions of the conventional bike, the points TP6, TP7, TP8, TP9, TP10, TP11, TP12, TP13 and TP14 of the test bike curve 344 are located at 49.2°, 61°, 71.6°, 81.4°, 90.3°, 100.4°, 110.3°, 120.6° and 130.8°, respectively, which represent only the wheel position of the test bike.

The areas 346, 348, 350 of the graph between the conventional bike curve 342 and the test bike curve 344 illustrate the change in the theoretical amount of available torque at the rear wheel effected by the present invention. The areas 346, 350, where curve 344 is below curve 342, indicates that the system of the present invention provides a lesser amount of available torque than the conventional bike system from 0° pedal position to approximately 35° pedal position and from approximately 145° pedal position to 180° pedal position. The area 348 where curve 344 is above curve 342, indicates that the system of the present invention provides a substantially greater amount of available torque from approximately 35° pedal position to approximately the 145° pedal position. In addition, the curve 344 indicates a high degree of concentration of available torque between approximately 60° pedal position and 120° pedal position in the maximum range of input force capability of the bike rider.

It is understood that the foregoing test results and calculations do not take into account actual bike riding conditions under which the actual resistance imposed on the drive system by the rear wheel affects the aforedescribed theoretical relationships between the pedals, crank arms, cams and oscillator means. Nonetheless, it is to be further understood that aforedescribed cam design characteristics take into account the actual resistance of the rear wheel and are such as to produce the desired results in the drive system.

While the foregoing illustrative cam design produces particularly beneficial results based upon the concept of matching theoretical maximum input force capability of the bike rider with minimum resistance of the system, the inventive concepts may be utilized to achieve other results, for example, the cam design may be changed to match theoretical maximum input force capability of the bike rider with maximum resistance of the system as illustrated by the cam design of FIG. 17. Such a design may be most beneficial for bike racing riders who have the capability of providing high input force at the beginning of the downward pedal movement. As shown in FIG. 17, the design of cam member 200 provides an overlap transition surface between lines 360, 362, a relatively small output torque advantage in the initial portion of the work surface from 0° pedal position beginning at 362 to approximately 15° pedal position beginning at 364; then a relatively large output torque advantage from approximately 15° pedal position at 364 to approximately 100° pedal position at 366; a relatively large output torque disadvantage from approximately 100° pedal position at 366 to approximately 165° pedal position at 368; and a relatively small output torque advantage from approximately 165° pedal position at 368 to 180° pedal position at 370.

For another example, the cam design may be changed to variously match input force capability of the bike rider with resistance of the rear wheel more in accordance with a general theoretical harmonic curve of effective input force, as illustrated in FIG. 13, wherein the cam design provides a relatively large output torque advantage from 0° pedal position at 372 to approximately 15° pedal position at 374; a relatively smaller output torque advantage from approximately 15° pedal position at 374 to approximately 35° pedal position at 376; a relatively small output torque disadvantage from approximately 65° pedal position at 378; a relatively large output torque disadvantage from approximately 65° pedal position at 378 to approximately 130° pedal position at 380; a relative small output torque disadvantage from approximately 130° pedal position at 380 to approximately 145° pedal position at 382; a relatively small output torque advantage from approximately 145° pedal position at 382 approximately 165° pedal position at 384; and a relatively large output torque advantage from approximately 165° pedal position at 384 to approximately 180° pedal position at 386.

An important advantage of the present invention is that the cam designs may be matched to individual input force capabilities of individual bike riders for achieving particular output torque characteristics. For example, general cam designs may be provided for various classes of bike riders, such as racing or recreational bike riders; men and women and boy and girl bike riders; and flat or hilly terrain bike riders. Furthermore, the right and left cam designs for a particular bike system may be varied in accordance with variations in input force capability of the right and left leg of a class of bike riders or of a particular bike rider whose input force capabilities may be measured to determine the most satisfactory cam design for the needs or desires of that particular bike rider. In order to facilitate the provision of varying cam designs for various bike riders, it is contemplated that the cam members be removably mounted on the bike to enable easy and quick change of cam members.

Embodiments of FIGS. 19-21

Referring now to FIGS. 19-21, certain portions of the drive system of the present invention are shown in further detail in alternative configurations and arrangement of components. The bicycle frame means 10 is illustratively shown to comprise conventional tubular frame portions 400, 402, 404, 406. Portions 400, 402, 404 are fixedly connected to and support a conventional crankshaft-bearing hub 408 in which the crankshaft 52 is rotatably supported. As is conventional, each of the crank arm means 20 is removably fixedly attached to the crankshaft 52 by conventional fastening means 410 with pedal means 24, 26 pivotally mounted on the outer end portion thereof. Each cam means 30, 32 comprises a cam member 200 removably fixedly mounted on one of the outer end portions of the crankshaft member 52 between the associated crank arm member 20 and the end portion of the hub 408 for rotation with the crankshaft member relative to the hub. Each of the oscillator means 34, 36 comprises an oscillator member 204 pivotally removably mounted between the cam member 200 and the frame portion 402 on the outer end portions of a pivot shaft means 412, which may be fixedly mounted in a housing member 414 fixedly attached to the frame portion 402 by suitable fastening means 416, as illustrated in FIG. 21.

Each oscillator member 204 comprises a pull arm portion 210 having a serrated forwardly facing elongated force transfer surface 218 and a laterally outwardly offset roller arm portion 220 rotatably supporting a roller member 222 in laterally outwardly offset relationship thereto for continuous engagement with cam surface 202.

A force transfer connecting means 224 is pivotally mounted on pivot shaft means 420 extending between and connecting and pivotally supporting end portions of pull bar members 422, 424. The connecting means 224 comprises a bar member 425 having tooth portions 426, 428 providing ratchet means releasably grippingly engageable with the serrated surface 218 in various radially inwardly and outwardly adjusted positions. Such release and adjustment may be effected by cable means 430, 432, one of which is attached to one end of bar member 425 at 434 by a length of cable wire 436 extending upwardly from the bottom of surface 218, and the other of which is attached to the other end of the bar member at 438 by a length of cable wire 440 extending downwardly from the top of surface 218. The cable wire 440 may be guidably mounted and confined in a groove 442 at the top of pull arm portion 210 and extends downwardly the rearwardly facing end surface and around the bottom of the oscillator member 204. The arrangement is such that actuation of a control lever attached to cable means 430 to cause movement of wire 436 in the direction of arrow 444 causes bar member 425 to pivot about shaft means 420 to release tooth portion 426 relative to surface 418 whereupon bar member 425 may be pulled downwardly along surface 218 with the inclined outer surface of tooth portion 428 sliding over the serrations until the adjustment force is removed, whereupon the bar member will immediately pivot back into holding engagement with surface 218. The bar member 425 may be similarly released and moved in the opposite direction by force applied in the direction of arrow 446 by wire 440.

Each of the rear drive wheel means 38, 40 are operatively connected to the rear end portions of the pull bar members 424, 426 as by a pivotal connecting pin means 450 rotatably supporting a sprocket wheel 452 mounted between and movable with the bar members. As previously described, a closed loop drive chain member 454 is mounted on sprocket wheel 452 and extends around sprocket wheels 456, 458 fixedly mounted relative to the frame means and the rear axle by suitable bracket means 460 and around movable sprocket wheel 462 connected to return assist spring means 464, attached to the frame portion at 466, by a pivotally mounted connecting bracket 468. If necessary or desirable, chain and/or sprocket wheel guide means 470, 472 may be fixedly mounted on the frame means in any suitable manner. The general operation of the system is as hereinbefore described.

Embodiments of FIGS. 22–25

Referring now to FIGS. 22–24, certain additional and alternative embodiments of the inventive concepts are illustrated wherein the frame means 10 comprises upwardly forwardly extending spaced generally parallel tubular portions 500, 501, upwardly rearwardly spaced generally parallel extending tubular portions 502, 503, defining a drive system cavity therebetween, rearwardly extending transversely spaced generally parallel tubular portions 504, 506 defining a drive system cavity therebetween, upwardly forwardly extending rear tubular portions 508, 510, defining a drive system cavity therebetween, a hub portion 512 connected to and supported by portions 500, 501, 502, 503, 504, 506, and rear axle bracket means 514 (only one of which is shown) connected to and supported by portions 504, 508 and 506, 510, respectively.

The drive system apparatus comprises two separate drive units of similar construction associated with each of two crank arm means and two pedal means only one each of which is shown in FIGS. 22–24. A crank arm means 516 having a pedal means 518 is rotatable about axis 520 of a crank shaft means (not shown) journalled in hub portion 512.

A roller support arm means 522 rotatably supporting cam driving roller means 534 extends radially outwardly relative to axis 520 opposite each crank arm means and is rotatably driven thereby in a circular path of movement 526 in the direction of arrow 527.

A combination cam means and oscillator means 530 is drivably associated with each cam driving roller means 524 for oscillatory movement between a maximum rearwardly displaced position (as shown in solid lines) and a maximum forwardly displaced position (as shown in broken lines) along an arcuate path of movement 526. Each cam and oscillator means 530 is pivotally mounted on a common shaft means 532 extending between spaced frame portions 504, 506 to provide a common pivotal axis 534 located, in the illustrative embodiment, generally transversely rearwardly of pivotal axis 520. As shown in FIG. 23, each cam and oscillator means 530 comprises a pull arm portion 536 having a forwardly facing elongated force transfer surface 538, which may be provided with serrated gripping means, extending generally radially outwardly relative to pivotal axis 534. Each cam and oscillator means 530 further comprises a cam support arm portion 540 on which a generally forwardly facing contoured cam surface 542 is fixedly supported. Roller guide and additional cam surface means are provided by side plate portions 544, 546, having inturned flange portions 548, 550 defining additional cam means in the form of parallel complanar cam surfaces 552, 554 which extend from a point located approximately on imaginary radial line 556 extending generally transversely relative to surface 538 from pivotal axis 534 in overlying parallel relationship to the upper portion of cam surface 542. A slot 558 is provided between flange portions 548, 550 to loosely accomodate roller arm member 522 for movement relative thereto. The apparatus is thus constructed and arranged so that during rotation of the associated crank arm 516 from approximately the 0° (upper vertical) position (or slightly before to provide overlap) to approximately the 90° (forward horizontal) position, the roller member 524 is first engaged with the lowermost portion of surface 542 and then moves upwardly along surface 542 as the oscillator pull arm portion 536 is driven forwardly to a position generally located approximately along radial line 556. Then during continued rotation of the associated crank arm 516 from approximately the 90° position to approximately the 180° (lower vertical) position, the roller member 524 engages the surfaces 552, 554 to continue to forwardly drive the oscillator arm portion 536 to the forwardmost oscillatory position. Then during continued rotation of the crank arm 516 from approximately the 180° position to the 0° position, the roller member 524 moves beyond the upper end of slot 558 and becomes operatively disengaged from the cam surface means on the cam-oscillator means 530 which is immediately moved rearwardly from the forwardmost position to the rearwardmost position by oscillator return means as hereinafter described, while the other crank arm is effective to forwardly drive the other cam-oscillator means to maintain continuous forward movement of the bicycle. The length and contour of cam surfaces 542, 552, 554 may be varied to achieve any desired results as hereinbefore described.

As previously described, each oscillator pull arm 536 is operably drivably connected to a corresponding one of the rear wheel drive means 38, 40 by connection means 560 which are selectively radially inwardly and outwardly adjustably positionable on surface 538 relative to pull arm portion 536 to provide a substantially infinitely variable range of speeds for the bicycle. An alternative form of rear wheel drive means is shown in FIGS. 22 and 24 to each comprise a closed loop chain member 562 drivingly engageable with a rear wheel drive sprocket 564 and looped around idler sprocket wheel units 566, 568, 570, 572 to effect a 2:1 speed change ratio between the cam-oscillator means and the rear wheel drive sprocket 564. Sprocket wheel unit 566 is connected to oscillator pull arm 536 by a connecting rod means 574, pivotally connected to adjustable connecting means 560 at the forward end thereof at 576 and pivotally connected to sprocket wheel unit 566 at the rearward end thereof at 578, for reciprocatory movement between a rearwardmost position (as shown by solid lines) and a forwardmost position (as shown by broken lines) corresponding to the rearwardmost position and the forwardmost position of the pull arm 536 of the corresponding associated cam-oscillator means 530. As previously described, a one-way ratchet means 580 may be associated with one of the sprocket wheel units 568 to permit return movement of the chain 562. Rear wheel drive system stabilizing means may be provided in the form of a cantilever type rod member 582 pivotally mounted on the frame means bracket portion 514 at 584 and extending forwardly in generally parallel coextensive relationship to connecting rod means 574. Guide and connecting means 586 are provided in an illustrative form of an L-shaped bracket member 588, FIG. 24, fixedly attached at one end 590 to rod member 574 for movement therewith and having an elongated transversely extending slot 592 provided in the other end 594 for loosely guidably receiving support rod member 582 to enable relative pivotal movement therebetween. Rod biasing means are provided between connecting rod 582 and bracket member 588 in an illustrative form of a compression spring member 596 mounted in slot 592 to bias an upwardly and downwardly movable guide member 598 into relatively slidable engagement with rod 582.

Each drive system of FIGS. 22–24, further comprises cam-oscillator return means in the form of a cable member 600 attached by one end portion 602 to sprocket wheel member 570, which is suitably slidably supported on a guide rail member 604 for reciprocable movement between an uppermost position (shown by solid lines) and a lowermost position (shown by broken lines) corresponding to the rearwardmost and forwardmost positions of sprocket wheel member 566, and attached by another end portion 606 to sprocket wheel member 566. The cable member 600 is looped around and supported by a pulley member 608 fixedly mounted on one of the frame portions 508, 510 above sprocket wheel 570, a pulley member 610 which may be coaxially mounted at the pivotal axis of support rod 582, and a pulley member 612 mounted on the outer end of support rod 582. The arrangement is such that, when sprocket wheel 566 is pulled forwardly from the rearwardmost position to the forwardmost position and sprocket wheel 570 is correspondingly pulled downwardly from the uppermost position to the downwardmost position, the cable 600 moves around pulley members 608, 610, 612 to maintain chain tension at all times. The cable 600 functions in the same manner during reverse movement of the chain 562 and sprocket wheels 566, 570 which may be effected in any suitable manner such as by spring means (not shown) attached between sprocket wheel 570 and the frame means 10.

The arrangement is such as to provide drive system confining means for locating substantially all of the drive system apparatus completely between the frame portions 500, 501, and 502, 503, and 504, 506, and 508, 510 and within the cavities provided therebetween. In order to further protect a bike rider from accidental contact with the drive system guard means may be provided in an illustrative form of tubular bicycle wheel type spoke members 620 mounted on and extending between the frame portions and/or additional support means 622 along each side of the bicycle. In this connection, it is to be noted that, in FIG. 22, for purposes of illustration only, the rear wheel drive means is illustrated relative to the frame means 10 as a left side rear wheel drive means whereas the rear wheel drive means of FIG. 22 is otherwise illustrated as part of a right side system in relationship to right side pedal-crank arm-roller-cam-oscillator-etc. portions of the drive system. Thus, as illustrated in FIG. 22, each of the right and left rear wheel drive means are mounted between the frame portions 504, 506 and 508, 510 as well as between the two spaced bracket means 514 on which the rear wheel axle and rear wheel are supported. The two spaced bracket means provided a convenient place to mount the various components of the rear wheel drive means which are not subject to reciprocable movement.

Referring now to FIG. 25, another alternative rear wheel drive means is shown to be mounted in a similar manner between spaced parallel tubular frame portions 630, 632 and 634, 636 and bracket means 638 (only one of which is shown). Each rear wheel drive means comprises an open ended chain member 640 attached at one end to the frame means 10 at 642 and looped around sprocket wheels 644, 646, and rear wheel drive sprocket 648 including a conventional one way clutch mechanism (not shown), with the other end portion 650 of the chain wound on a spring loaded chain reel means 652 to effect a 2:1 speed change ratio between oscillator pull arm 536 and the rear wheel drive sprocket 648. As previously described, such sprocket wheel 644 is connected to the associated pull arm 536 by a connecting rod means 574 pivotally connected to adjustable connecting means 560 at the forward end thereof at 576 and pivotally connected to sprocket wheel 644 at the rearward end thereof at 578.

Embodiments of FIGS. 26–30

Referring now to FIGS. 28–30, certain additional and alternative forms of oscillator means, including infinitely variable speed range means, as originally disclosed in my prior United States patent application Ser. No. 438,728 are shown.

FIG. 26 shows rear wheel drive means connecting rod members 660, 665 operatively connected to a pair of oscillatable rod members 666, 667 pivotally mounted on a shaft member 668 providing a common pivotal axis 669. Each of the rod members 666, 667 are operably associated with one of the pedals of the bicycle by a connector slide means in the form of collar portions 772, 773 of slender connecting rod members 774, 775 reciprocably supported in a movable collar member 771 adjustably slidably movably mounted on a support shaft member 770. The oscillatable rod members 666, 667 extend through collar portions 772, 773 which are selectively slidably moveable relative thereto radially outwardly and inwardly relative to pivotal axis 669 as collar member 771 is selectively slidably moved along support shaft member 770. The oscillator rod members are pivotally movable in opposite directions between maximum forward and rearward positions indicated by the broken lines in response to the movement of the pedals of the bicycle which are operatively connected to connecting rod members 774, 775. It is to be understood that, while FIG. 26 is a schematic illustration of the apparatus, connecting rod members 774, 775 and collar portions 772, 773 are actually located along a common horizontal plane so that the collar portions 772, 773 have similar radial locations relative to oscillating rod members 766, 767. The pedal movement produces an equal fixed length "pull stroke" for each connecting rod member 774, 775 and the vertical location of collar type slide member 771 on fixed shaft member 770 determines the amount (i.e., distance) of oscillatory movement of each oscillatable rod member 766, 767 and, hence, the amount (i.e., distance of movement of the associated rear wheel drive means, such as a chain, during each "pull stroke". Thus, the apparatus of FIG. 26 provides speed change means having an infinitely variable number of selectable speeds within a speed range determined by the range of adjustable movement of collar portions 772, 773 relative to oscillatable rod members 766, 767. The connecting rod members 774, 775, may be connected directly to the pedals by apparatus of the type shown in FIGS. 10-13 or connected indirectly to the pedals through cam means of the type shown and described hereinbefore. The connecting rod members 760, 765 may be connected to any suitable rear wheel drive means such as shown and described hereinbefore.

FIG. 27 shows another embodiment of oscillator means for producing infinitely variable output motion comprising an oscillatable lever member 780 pivotally mounted on a shaft member 782, fixedly supported relative to frame means 10, for oscillating movement between maximum forward and rearward positions. The lever member 780 is operably connected to one (pull only system) or two (pull and push system) connecting rod members 784, 786 by suitable pivotal connecting means 788, 790. Connecting rod members 784, 786 are operably associated with the pedals of the bicycle by suitable means such as apparatus of the type shown in FIGS. 10-13. An elongated slot 792 is provided in lever member 780 and connecting slide members 794, 796 are selectably slidable adjustably mounted therein for movement with the lever member 780. The rear wheel drive means are operably connected to lever member 780 by connecting means 798, 800, such as a rod member or a chain member or a cable member, pivotally attached at 802, 804 to slide members 794, 796. To further increase the range of infinitely variable speeds provided by slidable adjustment of slide members 794, 796 relative to lever member 780 to change the speed of the output motion of connecting means 798, 800, the connecting rod members 784, 786 may also be connected to lever member 780 by similar slide members operable in combination with slide members 794, 796 to provide for variable speed change of both the input and output motion or operable without slide members 794, 796 to provide for only variable speed change of the input motion from rod members 784, 786.

FIG. 28 shows another oscillator means embodiment providing infinite speed change means comprising a lever member 810 pivoted at 812 on the frame means 10 for oscillating movement between maximum forward and rearward positions. A collar type slide member 814 has a tapered opening 816 to receive the lever member 810 and to provide slide wall surfaces 818, 820 operably engageable with the lever member 810. The slider member is operably connected to the pedal of the bicycle by suitable apparatus, such as shown in FIGS. 10-13, for reciprocable forward and rearward movement thereby. Upward movement of the slider member relative to the lever member increases the amount of motion of the lever member. The lever member is operatively connected to rear wheel drive means by a connecting member 822 pivotally connected to the lever member at 824.

FIG. 29 shows another oscillator means providing infinitely variable speed change means comprising a lever member 830 pivotally mounted on the frame means at 832 for oscillating movement between maximum forward and rearward positions by a drive rod member 834 carrying a roller member 836 drivingly engageable with a cam surface 838 on a drive arm portion 840 of member 830. Rod member 834 is operably connected to the pedal of the bicycle by suitable drive apparatus, such as shown in FIGS. 10-13, to cause either constant or independently variable reciprocable movement of rod member 834, it being understood that rod member 834 is guided and restrained in a vertical position by suitable means (not shown). A collar type slider member 842 is slidably adjustably mounted on arm portion 844 of the lever member 830 and is operably connected to rear wheel drive means by connecting means 846 in the form of a cable or chain attached at one end 848 to the slider member and extending forwardly therefrom around a pulley or roller member 850 mounted on a bracket member 852 carried by rod member 834. The pulley or roller member 850 moves reciprocably with and the same horizontal distance as the rod member 834 while slider member travels with arm portion 844 along an arcuate path, the location and distance of which may be varied by slidable radial inward and outward adjustment relative to arm portion 844 and pivot 832.

FIG. 30 shows a variation of the apparatus of FIG. 29 comprising an elongated slot 854 in arm portion 844 which receives a pulley or roller type slider member 856 radially inwardly and outwardly adjustable therealong. One end of the chain or cable connecting means 846 is secured to bracket member 852 and a portion 858 of the connecting means 846 extends rearwardly around pulley or roller slider member 856 and another portion 860 of the connecting means extends forwardly around pulley or roller member 850 to provide increased mechanical advantage.

As disclosed in my prior application Ser. No. 438,728, the apparatus of FIGS. 26-30 and the apparatus of FIGS. 10-13 provide an infinitely variable, from zero up, power transmission system, in which a rotary power input is first translated into a reciprocating force that may be altered in magnitude prior to being retranslated into unidirectional rotary motion. The apparatus further provides means for converting rotary power input into reciprocating motion at constant demand force and for infinitely variable change in speeds. The apparatus further provides means for producing harmonic reciprocating motion in which the availability of input force is matched with demand of the transmission system. The apparatus further provides means for infinitely varying the velocity of fixed or variable rate reciprocating driving motion. The apparatus also provides means for producing reciprocating driving motion having other than harmonic motion which reciprocating motion can be stopped, slowed or speeded up in relation to the pedal-crank means during any part of the power input cycle.

While the inventive concepts have been disclosed hereinbefore by reference to certain illustrative and presently preferred embodiments of such concepts, it is to be understood that the various inventive concepts may be otherwise embodied. For example, while the oscillator means disclosed hereinbefore have been shown to be mounted in a presently preferred generally vertical upwardly extending position for movement between rearwardmost and forwardmost positions, it is contemplated that the oscillator means may be variously otherwise mounted and positioned. For another example, the cam means disclosed hereinbefore have been variously constructed, arranged, positioned and operably connected between and relative to crank arm means, roller arm means, roller means, cam surface means, and oscillator means which may be variously otherwise constructed, mounted, arranged, positioned, connected, combined or replaced by alternative embodiments. For another example, various rear wheel drive means have been disclosed hereinbefore which may also be variously otherwise constructed, mounted, arranged, positioned, connected, combined or replaced by alternative embodiments. Furthermore, in connection with the rear wheel drive means, embodiments disclosed herein, it is to be understood that the terms chain means and sprocket wheel means are intended to include various alternative devices and structure other than a link chain and a link chain sprocket wheel as presently commonly used for conventional bicycle drive systems. For example, some of the inventive concepts disclosed herein may be alternatively embodied in cable and pulley wheel devices which are capable of providing the same function as a link chain and link chain sprocket wheels. Also, it is contemplated that the inventive concepts are generally applicable to self propelled vehicles other than bicycles, such as, for example, tricycles and it is intended therefor that the term bicycle include such other vehicles.

Thus, it is further intended that the following claims be construed to include various alternative embodiments of the inventive concepts except insofar as limited by the prior art.

What is claimed is:

1. A bicycle or the like comprising:
   front and rear wheel means for enabling movement of the bicycle;
   frame means for supporting said wheel means and a bicycle rider;
   drive shaft means operably associated with the rear wheel means for unidirectional rotary motion by application of output force thereto to rotate the rear wheel means to propel the bicycle;
   foot operated pedal means mounted on said frame means for application of input forces by the bicycle rider;
   rotatable crank arm means mounted on said frame means and connected to said foot operated pedal means for rotary movement about an axis of rotation by application of the input forces and providing a 360° power input cycle therebetween;
   cam means mounted on said frame means for movement relative thereto and for operative association with each of said rotatable crank arm means for controlling the application of the input forces to said drive shaft means in accordance with predetermined force transfer characteristics;
   oscillator means mounted on said frame means for movement relative thereto about an axis of oscillation and for operative association with said cam means for transfer of the input forces to said oscillator means for causing oscillating movement of said oscillator means in accordance with the predetermined force transfer characteristics provided by said cam means;
   rear wheel drive means operably associated with said drive shaft means and said oscillator means for movement relative to said drive shaft means and for transfer of the input forces from said oscillator means to said rear wheel drive means and for applying output forces to said drive shaft means; and
   speed change means associated with said oscillator means for selective change of the velocity of the movement of said rear wheel drive means within a predetermined range of selectable velocities.

2. The invention as defined in claim 1 and further comprising:
   speed ratio multiplication means associated with said rear wheel drive means for increasing or decreasing the velocity imparted to said rear wheel drive means by said oscillator means throughout said range of selectable velocities.

3. The invention as defined in claim 1 and wherein said cam means being constructed and arranged for varying the rate of movement of said oscillator means relative to the rate of movement of said crank arm means during each 360° power input cycle.

4. The invention as defined in claim 1 and wherein said cam means being constructed and arranged for varying the rate of movement of said crank arm means relative to the movement of said oscillator means.

5. The invention as defined in claim 1 and wherein said cam means being constructed and arranged for varying the relative rates of movement of both said crank arm means and said oscillator means.

6. The invention as defined in claim 5 and wherein said cam means being further constructed and arranged for causing transmission of output force from said rear wheel drive means to said drive shaft means which output force is simultaneously derived from each of said crank arm means during a selected portion of each power input cycle.

7. The invention as defined in claim 1 and wherein said cam means being constructed and arranged for providing harmonic force transfer characteristics corresponding to harmonic force transfer characteristics of said crank arm means.

8. The invention as defined in claim 1 and wherein said cam means being constructed and arranged for providing harmonic force transfer characteristics inversely corresponding to harmonic force transfer characteristics of said crank arm means.

9. The invention as defined in claim 1 and wherein said cam means being constructed and arranged for providing varying force transfer characteristics corresponding to varying force transfer characteristics of each of said crank arm means resulting from varying force transfer characteristics of the legs and feet of a particular bicycle rider.

10. The invention as defined in claim 1 and wherein said cam means being constructed and arranged for providing force transfer characteristics corresponding to force transfer characteristics of said crank arm means resulting from varying force transfer characteristics and abilities of various classes of bicycle riders.

11. The invention as defined in claim 1 and wherein each of said rotatable crank arm means being operatively connected to said drive shaft means through a separate drive system comprising one each of said cam means, said oscillator means, said rear wheel drive means, and said speed change means.

12. The invention as defined in claim 11 and further comprising:
   remote control means mounted on said frame means for manual operation by a bicycle rider during a power input cycle and operably connected to each of said speed change means for selectively uniformly changing the velocity of the movement of each of said rear wheel drive means during the same power input cycle.

13. The invention as defined in claim 12 and further comprising:
   speed ratio multiplication means associated with each of said rear wheel drive means for increasing or decreasing the speed ratio between said rear wheel drive means and said oscillator means throughout said range of selectable velocities provided by said speed change means.

14. The invention as defined in claim 13 and further comprising:
additional remote control means mounted on said frame means for manual operation by a bicycle rider during a power input cycle and operably connected to each of said speed ratio multiplication means for selectively uniformly changing the speed ratio between each of said rear wheel drive means and each associated oscillator means during the same power input cycle.

15. The invention as defined in claim 14 and wherein said remote control means and said additional remote control means are mounted in juxtaposition for simultaneous operation by a bicycle rider.

16. The invention as defined in claim 1 and wherein said oscillator means comprising:
a pull arm portion extending generally vertically upwardly relative to said axis of oscillation and being movable between a maximum rearward position and a maximum forward position relative to the rear wheel means; and
said rear wheel drive means being connected to said pull arm portion and being movable therewith for causing unidirectional rotary movement of said drive shaft means during movement of said pull arm portion from said maximum rearward position to said maximum forward position.

17. The invention as defined in claim 16 and wherein said rear wheel drive means being further constructed and arranged for reciprocable movement relative to said drive shaft means.

18. The invention as defined in claim 17 and wherein said cam means and said oscillator means being further constructed and arranged for causing variable velocity reciprocating movement of said rear wheel drive means.

19. The invention as defined in claim 16 and wherein said speed change means comprising:
a variably radially adjustable connector member mounted on said pull arm portion for radial inward and outward adjusting movement thereon relative to said axis of oscillation and being connected to said rear wheel drive means.

20. The invention as defined in claim 16 and said rear wheel drive means comprising:
a movable wheel member mounted for reciprocable movement between a maximum radially inward position and a maximum radially outward position relative to said drive shaft means;
said reciprocable force transmission member being trained over said movable wheel member for reciprocable movement therewith;
said movable wheel member being connected to said oscillator means for causing reciprocable movement of said wheel member and said reciprocating force transmission member during oscillating movement of said oscillator means; and
said movable wheel member and said reciprocating force transmission member being movable along a path of motion extending generally forwardly horizontally from said drive shaft means to said oscillator means to provide substantially straight line transfer of force therebetween.

21. The invention as defined in claim 16 and wherein said oscillator means further comprising:
a cam arm portion extending generally transversely relative to said pull arm portion;
a roller member mounted on said cam arm member; said cam means comprising:
a rotatable cam plate member fixedly mounted on said crank arm means for rotation therewith;
a cam surface on said plate member having a predetermined fixed relationship to said crank arm means, and said roller member being operatively engaged with said cam surface to maintain a predetermined variable positional relationship between said oscillator means and said crank arm means during a power input cycle.

22. The invention as defined in claim 21 and wherein:
said cam plate member and said cam arm portion and said pull arm portion are located in juxtaposition to and in transversely offset relationship to said crank arm means.

23. The invention as defined in claim 22 and wherein each of said rotatable crank arm means being operatively connected to said drive shaft means through a separate drive system comprising one each of said cam means, said oscillator means, said rear wheel drive means, and said speed change means.

24. The invention as defined in claim 23 and wherein said frame means comprising:
spaced frame portions defining a drive system cavity therebetween, and each separate drive system being mounted in said drive system cavity.

25. The invention as defined in claim 24 and further comprising:
guard means mounted on said spaced frame portions to enclose drive system cavity to prevent contact between a bicycle rider and each separate drive system.

26. The invention as defined in claim 16 and wherein:
said pull arm portion having a forwardly facing elongated radially extending force transfer surface;
gripping means on said force transfer surface for gripping engagement with said speed change means;
said speed change means comprising a connecting slide member having rearwardly facing gripping means for gripping engagement with said gripping means on said force transfer surface; and
cable means connected to said connecting slide member to selectively release the gripping means and radially adjust the position of said connecting slide member along said force transfer surface.

27. The invention as defined in claim 26 and further comprising:
pull rod means pivotally connected to said connecting slide member and being operatively connected to said rear wheel drive means for transfer of the input forces from said oscillator means to said rear wheel drive means.

28. The invention as defined in claim 27 and wherein said pull rod means comprising:
spaced connecting rod members defining a cavity therebetween, said pull arm portion of said oscillator means extending between said spaced connecting rod members, said spaced connecting rod members extending forwardly beyond said force transfer surface; and
connecting pin means extending between said spaced connecting rod members in front of said force transfer surface and connecting said connecting slide member to said pull rod means.

29. The invention as defined in claim 1 and wherein said rear wheel drive means comprising:

a block and tackle system having a reciprocable force transmission member operably associated with said drive shaft means.

30. The invention as defined in claim 29 and wherein said rear wheel drive means further comprising:
   a movable wheel member mounted for reciprocable movement between a maximum radially inward position and a maximum radially outward position relative to said drive shaft means;
   said reciprocable force transmission member being trained over said movable wheel member for reciprocable movement therewith, and said movable wheel member being connected to said oscillator means for causing reciprocable movement of said wheel member and said reciprocable force transmission member during oscillating movement of said oscillator means.

31. The invention as defined in claim 1 and wherein said cam means comprising:
   a rotatable plate member fixedly mounted on said crank arm means for rotation therewith;
   a cam surface on said plate member having a predetermined fixed relationship to said crank arm means; and
   a cam follower member operatively connected to said oscillator means and operatively engageable with said cam surface to maintain a predetermined variable positional relationship between said oscillator means and said crank arm means during a power input cycle.

32. The invention as defined in claim 1 and wherein said cam means comprising:
   a cam surface fixedly mounted on said oscillator means for oscillating movement therewith, and having a predetermined positional relationship relative to said crank arm means; and
   a cam member operatively connected to and movable by and having a fixed relative positional relationship with said crank arm means, and said driving cam member being operatively engageable with said cam surface on said oscillator means to maintain a predetermined variable positional relationship between said oscillator means and said crank arm means during a power input cycle.

33. The invention as defined in claim 1 and wherein said cam means comprising:
   driving cam means operatively connected to and movable by and having a fixed positional relationship with said crank arm means;
   driven cam means operatively connected to said oscillator means and operatively engageable with said driving cam means, to maintain a predetermined variable positional relationship between said oscillator means and said crank arm means during a power input cycle.

34. The invention as defined in claim 33 and wherein said cam means being further constructed and arranged for causing transmission of output force from said rear wheel drive means to said drive shaft means which output force is simultaneously derived from each of said crank arm means during a selected portion of each power input cycle.

35. The invention as defined in claim 34 and wherein said cam means being constructed and arranged for providing harmonic force transfer characteristics corresponding to harmonic force transfer characteristics of said crank arm means.

36. The invention as defined in claim 34 and wherein said cam means being constructed and arranged for providing harmonic force transfer characteristics inversely corresponding to harmonic force transfer characteristics of said crank arm means.

37. The invention as defined in claim 34 and wherein said cam means being constructed and arranged for providing force transfer characteristics corresponding to force transfer characteristics of said crank arm means resulting from varying force transfer characteristics and abilities of various classes of bicycle riders.

38. A method of varyingly applying input force during repetitive power input cycles of a rotary or reciprocating input system of a bicycle or the like operatively connected to a rotary output system of a bicycle in which the input system is subject to varying magnitude and direction of application of input force and varying effective resistance of the output system during each power input cycle, comprising:
   varying the magnitude and direction of the transmitted input force during each power input cycle by continuously varying the effective radial and circumferential location of application of the transmitted input force in accordance with the varying effective resistance characteristics encountered by the input system; and
   continuously maintaining the application of the transmitted input force to the rotary output system throughout each power input cycle.

39. The invention as defined in claim 38 and in which maximum transmitted input force is generated at those circumferential locations of the application of input force to the system at which the effective input force is minimal.

40. The invention as defined in claim 38 and in which maximum transmitted input force is generated at those circumferential locations of the application of input force to the input system at which the effective input force is maximal.

41. The invention as defined in claim 38 and in which the variations in magnitude and direction of the transmitted input force are selected in accordance with predetermined variations of the input force.

42. The invention as defined in claim 41 and in which the predetermined variations of the input force are based upon varying capabilities of bicycle riders.

43. The invention as defined in claim 38 and further comprising:
   varying the rear wheel position relative to the pedal position during each 360° input force application cycle so that the effective resistance of the rear wheel to rotation is variably transferred to the pedals in a predetermined manner.

44. The invention as defined in claim 38 and further comprising:
   reducing the amount of input force required to overcome the effective resistance of the rear wheel to rotation at each rear wheel position during each 360° input force application cycle while varying the rear wheel position relative to the pedal position during each 360° input force application cycle so that the effective resistance of the rear wheel to rotation is variably transferred to the pedals during each 360° input force application cycle in a predetermined manner.

45. The invention as defined in claim 38 and further comprising:

varying the effective resistance of the rear wheel to rotation in accordance with and relative to pedal positions.

46. The invention as defined in claim 38 and further comprising:
variously matching the maximum input force capability of the rider with the resistance to rotation of the rear wheel.

47. The invention as defined in claim 46 and wherein the maximum input force capability of the rider is matched with the maximum effective resistance of the rear wheel to rotation.

48. The invention as defined in claim 47 and wherein the available torque at the rear wheel is maximized between pedal positions of approximately 15° to approximately 165°.

49. The invention as defined in claim 38 and further comprising:
variously matching the maximum input force capability of the rider with the minimum resistance to rotation of the rear wheel.

50. The invention as defined in claim 49 and wherein the amount of available torque at the rear wheel is concentrated between pedal positions of approximately 35° and approximately 145°.

51. The invention as defined in claim 49 and wherein the effective resistance of the rear wheel to rotation is concentrated between pedal positions of approximately 0° and approximately 30°.

52. The invention as defined in claim 49 and wherein the effective resistance of the rear wheel to rotation is progressively decreased between pedal positions of approximately 35° to approximately 90°.

53. The invention as defined in claim 49 and wherein the amount of available torque at the rear wheel is reduced between pedal positions of approximately 0° and approximately 35° and between pedal positions of approximately 145° to approximately 180°.

54. The invention as defined in claim 49 and wherein the amount of available torque at the rear wheel is at a maximum between pedal positions of approximately 60° and approximately 120°.

55. The invention as defined in claim 49 and wherein the effective resistance of the rear wheel to rotation is concentrated between pedal positions of approximately 150° and approximately 180°.

56. The invention as defined in claim 49 and wherein the effective resistance of the rear wheel to rotation is progressively increased between pedal positions of approximately 90° to approximately 150°.

57. The invention as defined in claim 38 and wherein the maximum input force capability of the rider is matched with the maximum force transmittal capability of the drive system.

58. The invention as defined in claim 38 and wherein the available torque at the rear wheel is of relatively large magnitude between pedal positions of approximately 0° to approximately 15°.

59. The invention as defined in claim 58 and wherein the available torque at the rear wheel is reduced between pedal positions of approximately 15° to approximately 35°.

60. The invention as defined in claim 59 and wherein the available torque at the rear wheel is further reduced between pedal positions of approximately 35° and approximately 65°.

61. The invention as defined in claim 60 and wherein the available torque at the rear wheel is further reduced between pedal positions between approximately 65° and approximately 130°.

62. The invention as defined in claim 61 and wherein the available torque at the wheel means is increased between pedal positions between approximately 130° to approximately 145°.

63. The invention as defined in claim 61 and wherein the available torque at the rear wheel is increased between pedal positions between approximately 130° to approximately 145°.

64. The invention as defined in claim 63 and wherein the available torque at the rear wheel is increased between pedal positions between approximately 145° to approximately 165°.

65. The invention as defined in claim 64 and wherein the available torque at the rear wheel is further increased between pedal positions of between approximately 165° to approximately 180°.

66. The invention as defined in claim 63 and wherein the available torque at the wheel means is increased between pedal positions between approximately 145° to approximately 165°.

67. The invention as defined in claim 66 and wherein the available torque at the wheel means is further increased between pedal positions of between approximately 165° to approximately 180°.

68. The invention as defined in claim 38 and wherein the available torque at the rear wheel is generally increased between pedal positions of approximately 0° to approximately 35°.

69. The invention as defined in claim 68 and wherein available torque is generally decreased between pedal positions of approximately 35° to approximately 145°.

70. The invention as defined in claim 69 and wherein available torque is generally increased between pedal positions of approximately 145° to approximately 180°.

71. A bicycle comprising:
rotatable wheel means for causing movement of the bicycle;
pedal means for supporting the foot of a rider and for transferring input force from the foot of the rider to said wheel means;
rotatable crank arm means connected to and rotatably operable through said pedal means for transferring input force from said pedal means to said wheel means during a 360° power input cycle;
shaft means connected to said crank arm means for rotatably supporting said crank arm means;
input-output force correlating means operably connected to and operable by said crank arm means for correlating input force from said crank arm means with output force delivered to said wheel means during the power input cycle and for continuously maintaining the application of output force to said wheel means throughout each power input cycle; and
rear wheel drive means connected to and operable by said input-output force correlating means to said wheel means.

72. The invention as defined in claim 71 and wherein said input-output force correlating means being further arranged and constructed for varying the wheel means position relative to the pedal position during each 360° input force application cycle so that the effective resistance of the rear wheel to rotation is variably transferred to the pedals in a predetermined manner.

73. The invention as defined in claim 71 and wherein said input-output force correlating means being further arranged and constructed for reducing the amount of input force required to overcome the effective resistance of the rear wheel to rotation at each rear wheel position during each 360° input force application cycle while varying the rear wheel position relative to the pedal position during each 360° input force application cycle so that the effective resistance of the rear wheel to rotation is variably transferred to the pedals during each 360° input force application cycle in a predetermined manner.

74. The invention as defined in claim 71 and wherein said input-output force correlating means being further arranged and constructed for varying the effective resistance of the rear wheel to rotation in accordance with and relative to pedal positions.

75. The invention as defined in claim 71 and wherein said input-output force correlating means being further arranged and constructed for variously matching the maximum input force capability of the rider with the resistance to rotation of the wheel means.

76. The invention as defined in claim 75 and wherein the maximum input force capability of the rider is matched with the maximum effective resistance of the wheel means to rotation.

77. The invention as defined in claim 76 and wherein the available torque at the wheel means is maximized between pedal positions of approximately 15° to approximately 165°.

78. The invention as defined in claim 71 and wherein said input-output force correlation means being further arranged and constructed for variously matching the maximum input force capability of the rider with the minimum resistance to rotation of the wheel means.

79. The invention as defined in claim 78 and wherein the effective resistance of the wheel means to rotation is concentrated between pedal positions of approximately 0° and approximately 30°.

80. The invention as defined in claim 78 and wherein the effective resistance of the wheel means to rotation is progressively decreased between pedal positions of approximately 35° to approximately 90°.

81. The invention as defined in claim 78 and wherein the amount of available torque at the wheel means is reduced between pedal positions of approximately 0° and approximately 35° and between pedal positions of approximately 145° to approximately 180°.

82. The invention as defined in claim 78 and wherein the amount of available torque at the wheel means is concentrated between pedal positions of approximately 35° and approximately 145°.

83. The invention as defined in claim 82 and wherein the amount of available torque at the wheel means is at a maximum between pedal positions of approximately 60° and approximately 120°.

84. The invention as defined in claim 82 and wherein the effective resistance of the wheel means to rotation is concentrated between pedal positions of approximately 150° and approximately 180°.

85. The invention as defined in claim 82 and wherein the effective resistance of the wheel means to rotation is progressively increased between pedal positions of approximately 90° to approximately 150°.

86. The invention as defined in claim 71 and wherein said input-output force correlation means being further arranged and constructed for matching the maximum input force capability of the rider with the maximum force transmittal capability of the drive system.

87. The invention as defined in claim 71 and wherein said input-output force correlation means being further arranged and constructed for providing available torque at the wheel means of relatively large magnitude between pedal positions of approximately 0° to approximately 15°.

88. The invention as defined in claim 87 and wherein the available torque at the wheel means is reduced between pedal positions of approximately 15° to approximately 35°.

89. The invention as defined in claim 88 and wherein the available torque at the wheel means is further reduced between pedal positions of approximately 35° and approximately 65°.

90. The invention as defined in claim 89 and wherein the available torque at the wheel means is further reduced between pedal positions between approximately 65° and approximately 130°.

91. The invention as defined in claim 71 and wherein said input-output force correlation means being further arranged and constructed for generally increasing available torque at the wheel means between pedal positions of approximately 0° to approximately 35°.

92. The invention as defined in claim 91 and wherein available torque is generally decreased between pedal positions of approximately 35° to approximately 145°.

93. The invention as defined in claim 92 and wherein available torque is generally increased between pedal positions of approximately 145° to 180°.

94. The invention as defined in claim 71 and wherein said input-output force correlating means comprising cam means for providing a force transfer surface to change the force input characteristics of said rotatable crank arm means in a predetermined manner.

95. The invention as defined in claim 94 and further comprising substantially variable speed change means connected to and operable by said input-output force correlating means for providing a range of selectable driving speeds for the bicycle.

96. The invention as defined in claim 95 and wherein said rear wheel drive means comprising speed ratio changing means for selectively changing the selectable driving speeds provided by said variable speed change means.

97. The invention as defined in claim 95 and wherein said variable speed change means comprising oscillator means pivotally mounted on the bicycle for oscillating movement between a rearward position and a forward position defining a force transfer work range.

98. The invention as defined in claim 97 and wherein:
said crank arm means comprises two crank arm members extending radially oppositely relative to said shaft means and being circumferentially spaced apart 180°;
said pedal means comprising two pedal members, one of said pedal members being operatively connected to one of said crank arm members for transferring force from one foot of the rider to said wheel means, and the other of said pedal members being connected to the other of said crank arm members for transferring force from the other foot of the rider to said wheel means; and said cam means comprising two cam members, one of said cam members being connected to and operable by one of said crank arm members, and the other of said cam means being connected to and operable by the other of said crank arm members, each of said cam members having contoured cam surfaces arranged to transfer force from said crank arm members to said oscillator means at predetermined times during rotation of said crank arm members and to vary forces transferred from said crank arm members to said oscillator means in accordance with the rotational position of said crank arm members.

99. The invention as defined in claim 98 and wherein:
said oscillator means comprises two oscillator arm members, one of said oscillator arm members being operatively connected to one of said cam members and the other of said oscillator arm members being operatively connected to the other of said cam members; second shaft means pivotally supporting said oscillator arm members, said oscillator arm members being arranged and constructed to be oscillatable relative to said second shaft means equal circumferential distances and to be equally oppositely movable to one another.

100. The invention as defined in claim 99 and wherein said oscillator arm means being further arranged and adapted for terminating the rearward movement of each oscillator means and initiating forward movement before termination of the forward movement of the other oscillator means to provide overlapping portions of force transfer from each oscillator means to said rear wheel means.

101. The invention as defined in claim 99 and wherein:
each of said oscillatable arm members having connection means mounted thereon and movable therewith for transferring force from said oscillatable arm members to said rear wheel drive means; adjustment means associated with said connection means for varying the radial position of said connection means relative to said oscillatable arm members to change the distance of arcuate movement of said connection means as imparted thereto by the oscillating movement of said oscillatable arm members.

102. The invention as defined in claim 101 and further comprising:
remote control means operatively connected to said adjustment means and being operable by the rider for simultaneously effecting uniform adjustment of the radial position of said connecting means.

103. The invention as defined in claim 102 and wherein:
said remote control means comprises release means associated with said adjustment means for adjusting the radial position of said connecting means during the oscillatory movement of said oscillatable arm members.

104. The invention as defined in claim 103 and wherein:
said rear wheel drive means comprises two rear wheel drive systems, one system being connected to and operable by one of said oscillatable arm members, and the other system being connected to and operable by the other of said oscillatable arm members, said rear wheel drive systems being arranged and constructed to alternatively transfer force to said wheel means.

105. The invention as defined in claim 104 and wherein:
said oscillatable arm members and said cam means being arranged and constructed to provide overlapping forward driving movement of said oscillator arm members and said rear wheel drive systems.

106. The invention as defined in claim 105 and further comprising:
force application adjustment means associated with said rear wheel drive systems for varying the ratio of force transfer from said rear wheel drive systems to said wheel means to selectively change the speed range of the bicycle.

107. The invention as defined in claim 106 and further comprising:
second remote control means operatively connected to said force adjustment means and being operable by the rider for simultaneously uniformly varying the ratio of force transfer from said rear wheel drive systems to said rear wheel means.

108. The invention as defined in claim 107 and wherein:
said first and second remote control means being located in juxtaposition for contemporaneous operation by the rider.

109. A bicycle or the like comprising:
frame means for supporting the bicycle components;
front and rear wheel means having parallel axis of rotation for enabling movement of the bicycle;
rear wheel drive means mounted on said frame means for causing rotation of said rear wheel means;
crank arm means rotatably mounted on said frame means and having an axis of rotation parallel to said axes of rotation of the wheel means for application of normally generally harmonic input forces for propelling the bicycle during a 360° power input cycle;
movable cam means being mounted on said frame means in juxtaposition to said crank arm means and being operable by said crank arm means for transferring force from said crank arm means to the rear wheel drive means;
movable oscillator means for operative association with said cam means and for oscillating movement between a rearwardmost position and a forwardmost position for transferring force from said cam means to the rear wheel drive means, the normal generally harmonic characteristics of force transferred by rotational movement of said crank arm means being changed by said cam means to variably displace said oscillator means in accordance with predetermined force transfer characteristics other than normal generally harmonic force characteristics; and
adjustable first connecting means selectively movably positionable relative to said oscillator means for connecting said oscillator means to said rear wheel drive means and for providing a range of variable speeds of rotation to be imparted to said rear wheel means and for transferring forces in accordance with said predetermined force transfer characteristics to said rear wheel drive means.

110. The invention as defined in claim 109 and wherein said oscillator means and said cam means having a common axis of movement.

111. The invention as defined in claim 110 and wherein said cam means comprising a cam surface mounted on and movable with said oscillator means.

112. The invention as defined in claim 111 and wherein said cam surface being elongated.

113. The invention as defined in claim 109 and further comprising:

roller arm means operatively connected to and being rotatable with said crank arm means for transferring the input forces from said crank arm means to said cam means;

rotatable roller means having an axis of rotation parallel to said axis of rotation of said crank arm means and being mounted on and carried by said roller arm means for transferring the input forces from said roller arm means to cam means.

114. The invention as defined in claim 113 wherein said cam means and said oscillator means are unitary and comprise:

a pull arm extending generally radially outwardly upwardly relative to said common axis of movement;

an elongated forwardly facing force transfer surface on said pull arm extending generally radially outwardly relative to said common axis of movement, said first connecting means being mounted on said pull arm and being engageable with said force transfer surface in various selectable radially displaced positions therealong for transferring force to said rear wheel drive means and for providing the range of variable speeds of rotation of the rear wheel of the bicycle;

a cam arm extending generally radially outwardly forwardly relative to said common axis of movement;

an elongated generally forwardly facing cam surface on said cam arm engageable by said roller means and being effective during rearward upward movement of said roller means to drive said pull arm from the rearwardmost position toward the forwardmost position;

a roller guide channel extending along said forwardly facing cam surface;

an elongated generally rearwardly facing cam surface on said cam arm engageable by said roller means and being effective during forward upward movement of said roller means to further drive said pull arm toward the forwardmost position, and a portion of said roller guide channel also extending along said rearwardly facing cam surface.

115. The invention as defined in claim 114 and further comprising:

elongated slot means in said portion of said guide channel for receiving said roller arm means and for permitting relative movement between said roller arm means and said cam means.

116. The invention as defined in claim 115 and wherein said elongated forwardly facing cam surface extends generally parallel to said forwardly facing force transfer surface.

117. The invention as defined in claim 116 and wherein said elongated rearwardly facing cam surface also extends generally parallel to said forwardly facing force transfer surface.

118. The invention as defined in claim 117 and wherein said common pivotal axis is located rearwardly of said axis of rotation of said crank arm means in a substantially horizontal plane including said axis of rotation of said crank arm means.

119. The invention as defined in claim 109 and wherein said rear wheel drive means comprising:

rotatable drive wheel means mounted on said frame means for driving the rear wheel means;

connecting drive means associated with said drive wheel means for transferring force thereto to cause rotation thereof and of said rear wheel means;

at least one idler wheel means mounted on said frame means for association with said connecting drive means;

reciprocable wheel means reciprocably movably mounted relative to said frame means for association with said connecting drive means and for reciprocable movement between a radial innermost position and a radial outermost position relative to said drive wheel means; and second connecting means for connecting said reciprocable wheel means to said first connecting means and said oscillator means and for causing reciprocable movement of said reciprocable wheel means and movement of said connecting drive means and rotation of said drive wheel means in response to movement of said oscillator means between the rearwardmost position and the forwardmost position thereof.

120. The invention as defined in claim 119 and further comprising:

support and guide means mounted on said frame means for supporting and guiding said reciprocable wheel means and said connecting drive means during movement between the radial innermost position and the radial outermost position.

121. The invention as defined in claim 120 and wherein said support and guide means comprising:

elongated rod means pivotally mounted on said frame means for pivotal movement relative thereto, and extending along the reciprocable path of movement of said reciprocable wheel means, and bracket means mounted between said elongated rod means and said reciprocable wheel means and being reciprocably movable relative to at least one of said elongated rod means and said reciprocable wheel means and having guide and support surfaces engageable therewith to maintain substantially constant straight line displacement of said reciprocable wheel means and said connecting drive means between said radial innermost position and said radial outermost position.

122. The invention as defined in claim 120 and further comprising tension maintaining means for maintaining tension in said connecting drive means during movement of said reciprocable wheel means between said radial innermost position and said radial outermost position.

123. The invention as defined in claim 122 and wherein said tension maintaining means comprising:

spring loaded reel means mounted on said frame means and being associated with one end of said connecting drive means for unwinding of said connecting drive means therefrom against spring bias during movement of said reciprocable wheel means from the radial innermost position to the radial outermost position and for winding of said connecting drive means thereon by spring bias during movement of said reciprocable wheel means from the radial outermost position to the radial innermost position.

124. The invention as defined in claim 122 and wherein said tension maintaining means comprising:

cable means mounted on said frame means and being connected to opposite end portions of said connecting drive means for creating tension therebetween and being movable therewith for maintaining tension therebetween.

125. The invention as defined in claim 119 and wherein said connecting drive means comprising a closed loop member;
   a first idler wheel mounted on said frame means and being located generally rearwardly of said drive wheel means and being engageable with a first looped portion of said closed loop member;
   a second idler wheel mounted on said frame means and being located generally forwardly and upwardly of said drive wheel means and being engageable with a second looped portion of said closed loop member;
   said reciprocable wheel means being engageable with a third looped portion of said closed loop member and being movable forwardly and rearwardly along a generally horizontal path of movement located between said second idler wheel and said drive wheel means; and
   a third idler wheel means reciprocably mounted on said frame means and being located above and forwardly of said first idler wheel and being engageable with a fourth looped portion of said closed loop member for reciprocable movement between a radial outermost position and a radial innermost position relative to said drive wheel means corresponding, respectively, to said radial innermost position and said radial outermost position of said reciprocably movable wheel means.

126. The invention as defined in claim 125 and wherein:
   said third idler wheel means being movable generally upwardly and downwardly along an upwardly forwardly inclined path of movement.

127. The invention as defined in claim 109 and wherein said frame means comprising:
   a first pair of spaced generally horizontal parallel frame members extending between said crank arm means and said rear wheel means;
   a second pair of spaced generally vertical parallel frame members extending upwardly from the rotation of axis of said crank arm means;
   a third pair of spaced generally vertical parallel frame members extending upwardly from the rear wheel means;
   the first, second and third pairs of spaced parallel frame members defining a drive system cavity therebetween; and
   said cam means and said oscillator means and said connecting means and said rear wheel drive means being located within said drive system cavity.

128. The invention as defined in claim 127 and further comprising:
   safety guard means mounted on said frame means for covering the side openings between the first, second and third pairs of frame members to prevent accidental contact by a bicycle rider with the drive system.

129. The invention as defined in claim 128 and wherein:
   said safety guard means comprising a plurality of elongated spaced spoke-like members.

130. The invention as defined in claim 119 and wherein:
   said connecting drive means comprising an unclosed connecting member being looped around and engageable with said reciprocable wheel means and having a terminal portion fixedly attached to said frame means;
   a first idler wheel mounted on said frame means for engagement with an intermediate loop portion of said unclosed connecting member and being located rearwardly of said drive wheel means;
   said reciprocable wheel means being movable forwardly and rearwardly along a generally horizontal path of movement located forwardly of said drive wheel means;
   a wheel reel means mounted on said frame means and being located above and forwardly of said first idler wheel for connection to the second end portion of said unclosed connecting member and for unwinding a length of said unclosed connecting member during forward movement of said reciprocable wheel means and for unwinding up to the length of said unclosed connecting member during rearward movement of said reciprocable wheel means.

131. Apparatus for varyingly applying input force during repetitive power input cycles of a rotary or reciprocating input system of a bicycle or the like having power input pedals or the like and being operatively connected to a rotary output system of a bicycle or the like having a drive wheel or the like and in which the input system is subject to varying magnitude and direction of application of input force and varying effective resistance of the output system during each power input cycle, comprising:
   means for varying the magnitude and direction of the transmitted input force during each power input cycle by continuously varying the effective radial and circumferential location of application of the transmitted input force in accordance with the varying effective resistance characteristics encountered by the input system; and
   means for continuously maintaining the application of the transmitted input force to the rotary output system throughout each power input cycle.

132. The invention as defined in claim 131 and wherein said means being constructed and arranged for:
   varying the drive wheel position relative to the pedal position during each 360° input force application cycle so that the effective resistance of the rear wheel to rotation is variably transferred to the pedals in a predetermined manner.

133. The invention as defined in claim 131 and wherein said means being further constructed and arranged for:
   reducing the amount of input force required to overcome the effective resistance of the drive wheel to rotation at each drive wheel position during each 360° input force application cycle while varying the drive wheel position relative to the pedal position during each 360° input force application cycle so that the effective resistance of the drive wheel to rotation is variably transferred to the pedals during each 360° input force application cycle in a predetermined manner.

134. The invention as defined in claim 131 and wherein said means being further constructed and arranged for:
   varying the effective resistance of the drive wheel to rotation in accordance with and relative to pedal positions.

135. The invention as defined in claim 131 and wherein said means being further constructed and arranged for:

variously matching the maximum input force capability of the rider with the resistance to rotation of the drive wheel.

136. The invention as defined in claim 131 and wherein said means being further constructed and arranged for:
variously matching the maximum input force capability of the rider with the minimum resistance to rotation of the drive wheel.

137. The invention as defined in claim 131 and wherein said means being further constructed and arranged for variously matching the maximum input force capability of the rider with the maximum force transmittal capability of the drive system.

138. The invention as defined in claim 131 and further comprising:
variable speed change means connected to and operable by the input system for providing a range of selectable driving speeds for the bicycle.

139. The invention as defined in claim 138 and further comprising:
speed ratio changing means for selectively changing the selectable driving speeds provided by said variably speed change means.

140. The invention as defined in claim 138 and wherein said variable speed change means comprising oscillator means pivotally mounted on the bicycle for oscillating movement between a rearward position and a forward position defining a force transfer work range.

* * * * *

REEXAMINATION CERTIFICATE (2265th)

United States Patent [19]
Brown

[11] B1 4,133,550
[45] Certificate Issued Apr. 12, 1994

[54] BICYCLE AND POWER TRANSMISSION SYSTEM

[76] Inventor: Lawrence G. Brown, P.O. Box 4107, San Marcos, Calif. 92069

Reexamination Requests:
No. 90/002,207, Nov. 21, 1990
No. 90/002,465, Oct. 4, 1991

Reexamination Certificate for:
Patent No.: 4,133,550
Issued: Jan. 9, 1979
Appl. No.: 874,786
Filed: Feb. 3, 1978

Related U.S. Application Data

[63] Continuation of Ser. No. 668,043, Mar. 18, 1976, abandoned.

[51] Int. Cl.⁵ .............................................. B60M 23/00
[52] U.S. Cl. .................................. 280/210; 280/238; 280/241; 280/259; 280/261
[58] Field of Search ............... 180/210, 236, 252, 253, 180/255, 256, 259, 261

[56] References Cited

U.S. PATENT DOCUMENTS

| | | |
|---|---|---|
| 515,449 | 2/1894 | Scovell . |
| 885,982 | 4/1908 | Delacroix .............................. 280/259 |
| 2,693,119 | 11/1954 | Payberg et al. . |
| 3,259,398 | 7/1966 | Hattan . |
| 3,375,022 | 3/1968 | Hattan .................................. 280/261 |
| 3,834,733 | 12/1972 | Harris . |
| 3,906,807 | 9/1975 | Trammell, Jr. . |
| 4,029,334 | 6/1977 | Trammell, Jr. . |

FOREIGN PATENT DOCUMENTS

| | | |
|---|---|---|
| 389663 | 7/1932 | Belgium . |
| 2219530 | 10/1973 | Fed. Rep. of Germany . |
| 361511 | 3/1907 | France . |
| 821216 | 11/1937 | France . |
| 880851 | 4/1943 | France . |
| 911327 | 3/1946 | France .................................. 280/259 |
| 909106 | 4/1946 | France . |
| 974415 | 2/1951 | France . |
| 984583 | 7/1951 | France . |
| 1027471 | 5/1953 | France . |
| 2264709 | 10/1975 | France .................................. 280/261 |
| 2265018 | 10/1975 | France . |
| 2295867 | 7/1976 | France .................................. 280/259 |
| 2315427 | 1/1977 | France .................................. 280/261 |
| 375774 | 10/1939 | Italy ..................................... 280/210 |
| 472454 | 6/1952 | Italy . |
| 480191 | 4/1953 | Italy . |
| 24-4568 | 11/1949 | Japan . |
| 51-4437 | 7/1973 | Japan . |
| 48-25545 | 7/1973 | Japan . |
| 49-2046 | 1/1974 | Japan . |
| 49-39148 | 4/1974 | Japan . |
| 282923 | 5/1952 | Switzerland . |
| 18426 | of 1895 | United Kingdom ................. 280/236 |
| 24525 | of 1895 | United Kingdom ................. 280/259 |
| 9377 | of 1896 | United Kingdom ................. 280/261 |
| 17026 | of 1896 | United Kingdom ................. 280/261 |
| 29661 | of 1896 | United Kingdom ................. 280/261 |
| 379 | of 1898 | United Kingdom . |

OTHER PUBLICATIONS

Dailey et al. Dec. 1975 "Elliptical Sprockets".

*Primary Examiner*—Mitchell J. Hill

[57] ABSTRACT

A drive system for providing propulsion forces having predetermined characteristics for a bicycle or the like having a rear wheel manually operable by application of rider generated input forces through pedals mounted on crank arms operatively connected to a crank shaft with cam means operable by the crank shaft and the crank arms, the cam means being designed to variously modify the available input and/or effective output force characteristics in accordance with predetermined desired characteristics and being operatively connected to and driving an oscillator means with bike speed change means associated therewith to provide a substantially infinitely variable selectable range of bike speeds, and rear wheel driving means operatively connected to and driven by the oscillator means and operatively connected to and driving the rear wheel of the bike with bike speed ratio changing means associated therewith to provide for selective multiplication of the ratio of application of available bike speeds in the substantially infinitely variable range of speeds provided by the oscillator means to the rear wheel of the bike.

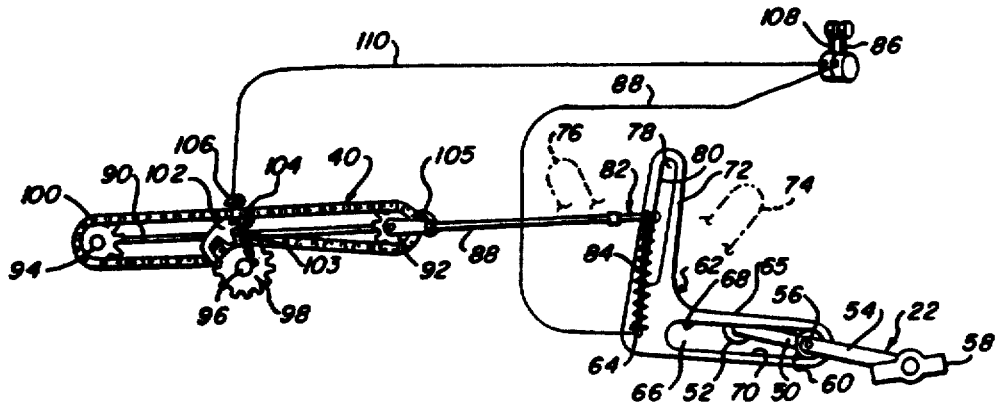

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1-37, 39, 48, 58-67, 69, 70, 77, 87-90, 92, 93, 97-108, 110-112, 114-126, 129 and 130 is confirmed.

Claims 38, 40-47, 49-57, 68, 71-76, 78-86, 91, 94-96, 109, 113, 127, 128 and 131-140 are cancelled.

* * * * *